United States Patent
Igami et al.

(10) Patent No.: US 7,265,680 B2
(45) Date of Patent: Sep. 4, 2007

(54) OBJECT TILT AND FALL DETECTION APPARATUS

(75) Inventors: Hideo Igami, Kanagawa (JP); Yoshikazu Kunimatsu, Kanagawa (JP); Masahiro Saika, Kanagawa (JP)

(73) Assignee: IBM Japan Business Logistics Co., Ltd., Tokyo (JP)

( * ) Notice: Subject to any disclaimer, the term of this patent is extended or adjusted under 35 U.S.C. 154(b) by 140 days.

(21) Appl. No.: 10/527,669

(22) PCT Filed: Sep. 16, 2003

(86) PCT No.: PCT/JP03/11783

§ 371 (c)(1),
(2), (4) Date: Mar. 11, 2005

(87) PCT Pub. No.: WO2004/027806

PCT Pub. Date: Apr. 1, 2004

(65) Prior Publication Data

US 2005/0248467 A1  Nov. 10, 2005

(30) Foreign Application Priority Data

Sep. 18, 2002 (JP) .............................. 2002-271688
May 14, 2003 (JP) .............................. 2003-136094

(51) Int. Cl.
*G08B 21/00* (2006.01)
(52) U.S. Cl. .............................. 340/689; 200/61.45 R; 200/61.52

(58) Field of Classification Search ................ 340/689, 340/686.1, 691.1; 200/61.45 R, 61.52
See application file for complete search history.

(56) References Cited

U.S. PATENT DOCUMENTS

| | | | |
|---|---|---|---|
| 4,438,720 A | 3/1984 | Conn | |
| RE32,570 E | 1/1988 | Conn | |
| 5,528,228 A * | 6/1996 | Wilk | 340/540 |
| 5,554,975 A * | 9/1996 | Hall et al. | 340/573.7 |
| 6,486,788 B1* | 11/2002 | Zagone et al. | 340/686.1 |
| 6,727,824 B1* | 4/2004 | Miseli et al. | 340/689 |
| 7,061,390 B2* | 6/2006 | Murata | 340/686.1 |

FOREIGN PATENT DOCUMENTS

| | | |
|---|---|---|
| JP | 40-29699 Y1 | 10/1965 |
| JP | 51-65273 | 5/1976 |
| JP | 64-48611 | 3/1989 |
| JP | 8-62238 A | 3/1996 |
| JP | 11-14772 A | 1/1999 |
| JP | 2000-304767 A1 | 11/2000 |
| JP | 2001-93391 A | 4/2001 |
| JP | 2001-143583 A | 5/2001 |
| JP | 2002-083530 | 3/2002 |

* cited by examiner

*Primary Examiner*—John Tweel, Jr.
(74) *Attorney, Agent, or Firm*—Posz Law Group, PLC; R. Eugene Varndell, Jr.

(57) ABSTRACT

An object tilt and fall detection apparatus (30) capable of detecting the tilt and fall of an object by using a disk body (11) rolling according to the tilt of the object, comprising a timer means (50) starting the measurement of a time, stopping the measurement of the time by the rolling of the disk body (11), and displaying the time at which the measurement was stopped.

5 Claims, 26 Drawing Sheets

OBJECT TILT AND FALL DETECTION APPARATUS

This application is a U.S. national phase application of International Application No. PCT/JP03/11783, filed Sep. 16, 2003, which claims priority from Japanese patent application Nos. 2002-271688, filed Sep. 18, 2002, and 2003-136094, filed May 14, 2003.

TECHNICAL FIELD

The present invention relates to an object tilt and fall detection apparatus for detecting the tilt and fall of an object such as a box body, and more particularly to an object tilt and fall detection apparatus which displays accurately the time at which an object tilts or falls.

BACKGROUND ART

Conventionally, when transporting instruments which are easily damaged by tilting and falling, for example precision instruments such as hard disks, an object tilt and fall detection apparatus for detecting the tilt and fall of an object is disposed on a box body (object) in which a large number of the precision instruments is stored.

An example of this type of object tilt and fall detection apparatus is described in U.S. Pat. No. RE 32570.

FIG. 21 is a schematic perspective view showing a conventional object tilt and fall detection apparatus 1 disposed on a box body 2 (object) in which a large number of precision instruments such as hard disks is stored.

Note that in FIG. 21, the object tilt and fall detection apparatuses 1 are disposed respectively on each side face of the box body 2 in consideration of the tilting or falling direction of the box body 2.

As shown in the front view of FIG. 22 and the schematic A-A sectional view of FIG. 23, this conventional object tilt and fall detection apparatus (to be referred to simply as "detection apparatus" hereafter) comprises a main body 3 having a rectangular front face and formed with a recessed portion 4 having a C-shaped cross section, and a lid body 5 for covering the recessed portion 4 of the C-shaped cross section from the rear face. Adhering means 6 such as double-sided adhesive tape, for adhering the detection apparatuses 1 to each side face of the box body 2 in FIG. 21, are provided on the rear face of the lid body 5 and a flange portion 3a of the main body 3.

Note that both the main body 3 and lid body 5 described above are formed from a synthetic resin such as plastic.

As shown in FIG. 24, which is a cross section taken on a line B-B in FIG. 23, tilt detection means 10 for detecting a tilted state of the main body 3 are disposed inside the recessed portion 4 of the main body 3.

The tilt detection means 10 are constituted by a disk body 11 which rolls in accordance with the tilted state of the main body 3, and a guide member 12 for guiding the disk body 11.

The guide member 12 comprises a reference guide 13 which supports the disk body 11 from below when the disk body 11 is in its initial position, a pair of tilt guides 14, 15 for guiding the rolling motion of the disk body 11 when the main body 3 tilts to the left or right, and a restriction guide 16 which prevents the disk body 11 from moving a fixed distance or more.

Discharge ports 17, 18 through which the disk body 11 may roll are formed between the restriction guide 16 and respective tip ends 14a, 15a of the pair of tilt guides 14, 15.

The disk body 11 is formed from a metal plate, and each of the guides 13, 14, 15, 16 comprises a rib formed integrally with the main body 3.

Note that in FIG. 24, the reference numeral 20 denotes a circular transparent part formed in the main body 3. This transparent part 20 is formed so that the existence of the disk body 11 in its initial position can be confirmed easily from the front face of the main body 3 shown in FIG. 22.

According to this conventional detection apparatus 1, when the box body 2 shown in FIG. 21 tilts or falls such that the main body 3 of the detection apparatus 1 adhered to the box body 2 tilts in the direction of the arrow C, as shown in FIG. 25, the disk body 11 rolls along the tilt guide 14 from its initial position shown in FIG. 24, passes through the discharge port 17 between the tilt guide 14 and restriction guide 16, and falls downward, as shown in FIG. 25.

When the disk body 11 falls through the discharge port 17 of the restriction member 12 in this manner, the disk body 11 moves to a position in which it cannot be seen through the transparent part 20 of the main body 3.

Even when the fallen box body 2 is subsequently returned to its initial position shown in FIG. 21 such that the main body 3 of the detection apparatus 1 is returned to its initial position shown in FIG. 26, the disk body 11 does not return to its initial position restricted between the reference guide 13 and the pair of tilt guides 14, 15, and hence the disk body 11 cannot be seen through the transparent part 20.

Hence, even when the box body 2 is returned to its original position after falling over, an operator cannot confirm the existence of the disk body 11 by looking through the transparent part 20 of the detection apparatus 1, and it is therefore possible to definitely confirm that the box body 2 has fallen or tilted once.

Incidentally, with the conventional object tilt and fall detection apparatus 1 described above, it is possible for the operator to confirm that the box body 2 has not fallen or tilted by confirming the presence of the disk body 11 through the transparent part 20 of the main body 3. If the presence of the disk body 11 cannot be confirmed, the fact that the box body 2 has fallen or tilted once may be acknowledged.

However, with the conventional object tilt and fall detection apparatus 1 described above, although it is possible to confirm that the box body 2 has fallen, it is impossible to confirm the time at which the box body 2 falls.

As a result, if the object falls during transportation, for example, it is impossible to specify the stage of the transportation process at which the falling incident occurs, or in other words the approximate time at which the falling incident occurs.

DISCLOSURE OF THE INVENTION

In consideration of these circumstances, an object of the present invention is to provide an object tilt and fall detection apparatus with which the time at which the object tilts or falls can be confirmed.

To achieve this object, a first embodiment of the present application is an object tilt and fall detection apparatus for detecting the tilt and fall of an object using a disk body which rolls in accordance with the tilt of the object, characterized in comprising a cover member having a deformable recessed portion for positioning and storing the disk body, the cover member releasing the disk body from the recessed portion when the recessed portion is deformed such that the disk body moves to a position where the disk body rolls in accordance with the tilt of the object; and timer means for starting time measurement, stopping the time measurement in accordance with the rolling of the disk body, and displaying the time at which the measurement is stopped.

Further, to achieve this object, a second embodiment of the present application is an object tilt and fall detection apparatus for detecting the tilt and fall of an object using a conductive disk body which rolls in accordance with the tilt of the object, characterized in comprising a removable temporary locking pin for restraining the movement of the disk body when fitted into the disk body and releasing the restriction on the disk body when removed from the disk body; and timer means comprising at least a display device for displaying time; a measurement start switch for transmitting a time measurement start signal; a measurement stop switch constituted by a printed wiring pattern group comprising at least a pair of printed wiring patterns opposing each other at a predetermined interval without intersecting, for transmitting a time measurement stop signal by short-circuiting electrically when contacted slidingly by the conductive disk body; and a controller for starting the time measurement on the basis of the measurement start signal from the measurement start switch, stopping the time measurement on the basis of the measurement stop signal from the measurement stop switch, and causing the display device to display a measurement stop time.

BEST MODE FOR CARRYING OUT THE INVENTION

Figure 1:
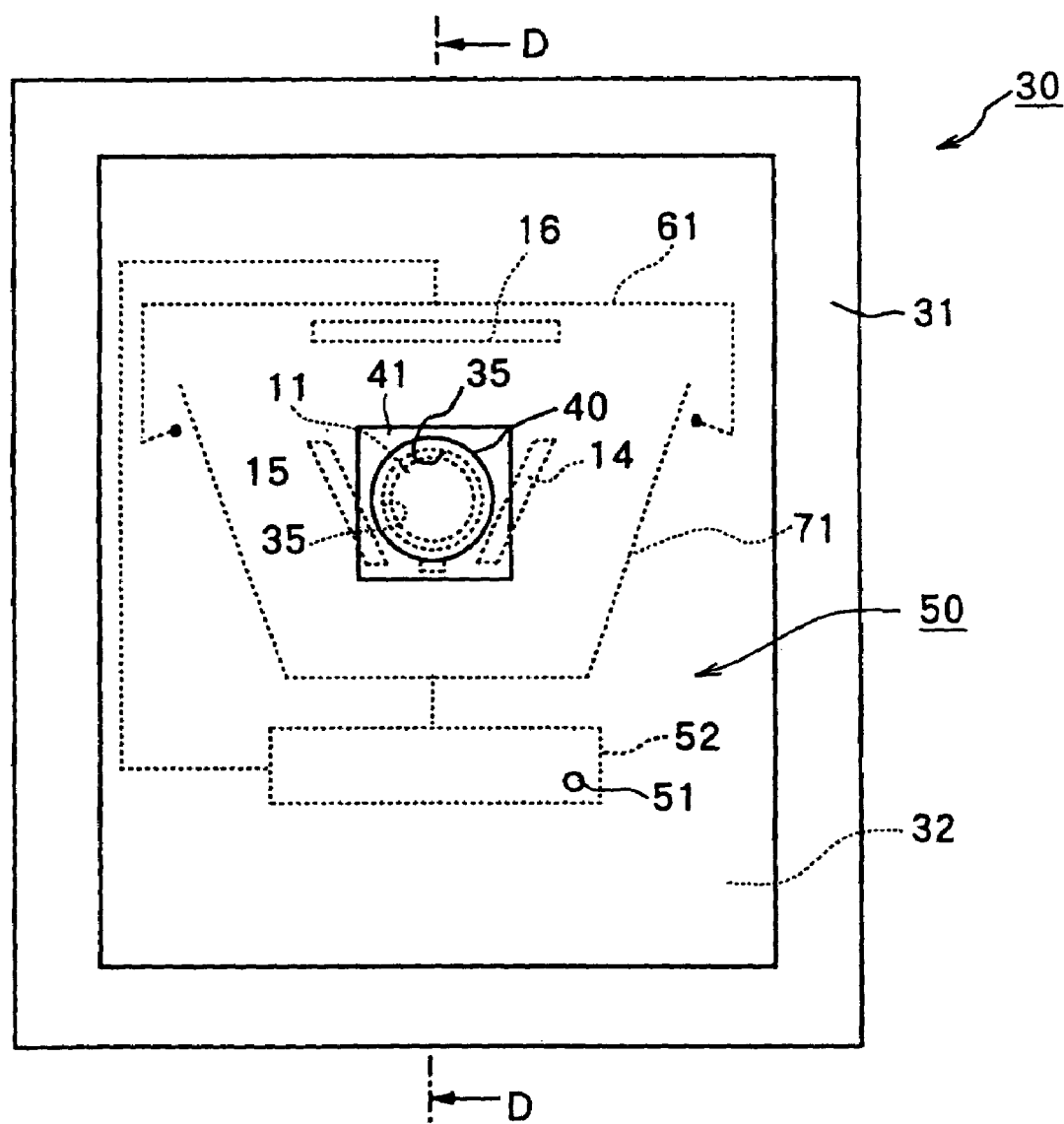
FIG. 1 is a schematic front view of an object tilt and fall detection apparatus according to a first embodiment of this application.

An embodiment of the object tilt and fall detection apparatus according to the present invention will now be described in detail. FIG. 1 is a front view of an object tilt and fall detection apparatus 30 according to a first embodiment of this application. Identical parts to those shown in FIGS. 21 through 26 are illustrated with identical reference symbols.

Figure 2:
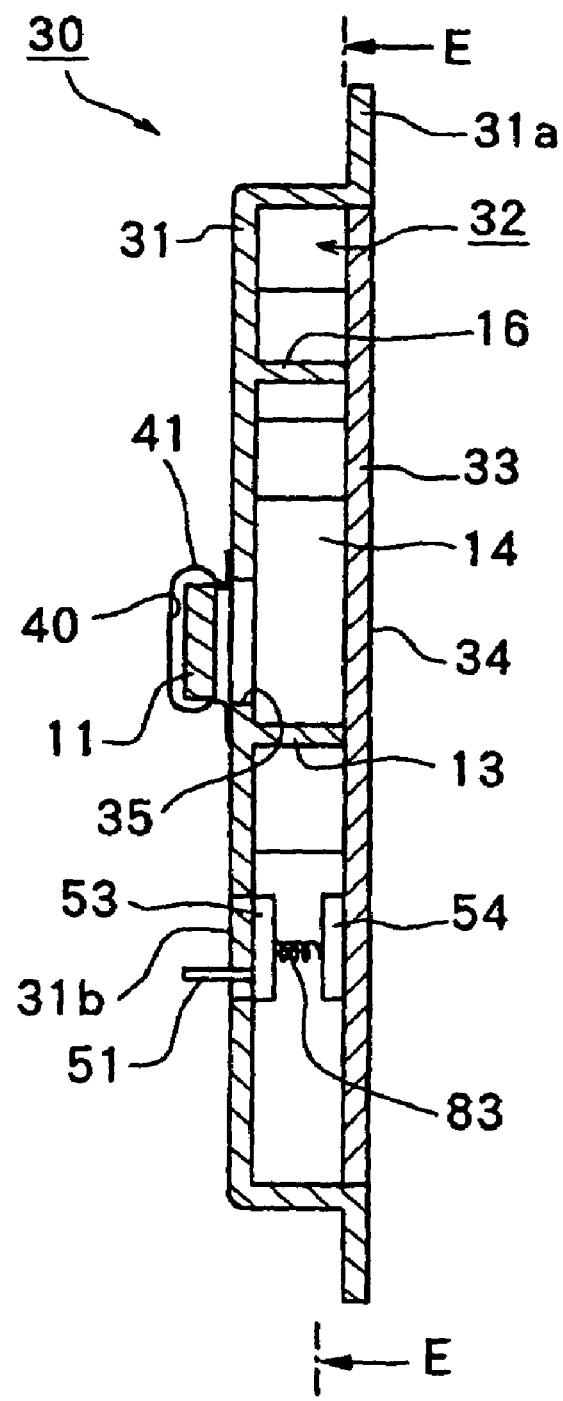
FIG. 2 is a sectional view taken along a line D-D of FIG. 1.

As shown in the front view of FIG. 1 and the line D-D schematic sectional view of FIG. 2, this object tilt and fall detection apparatus (to be referred to simply as "detection apparatus" hereafter) 30 is also constituted by a main body 31 having a rectangular front face and a recessed portion 32 formed with a C-shaped cross section, and a lid body 33 covering the recessed portion 32 from the rear face, as in the conventional example.

Figure 21:
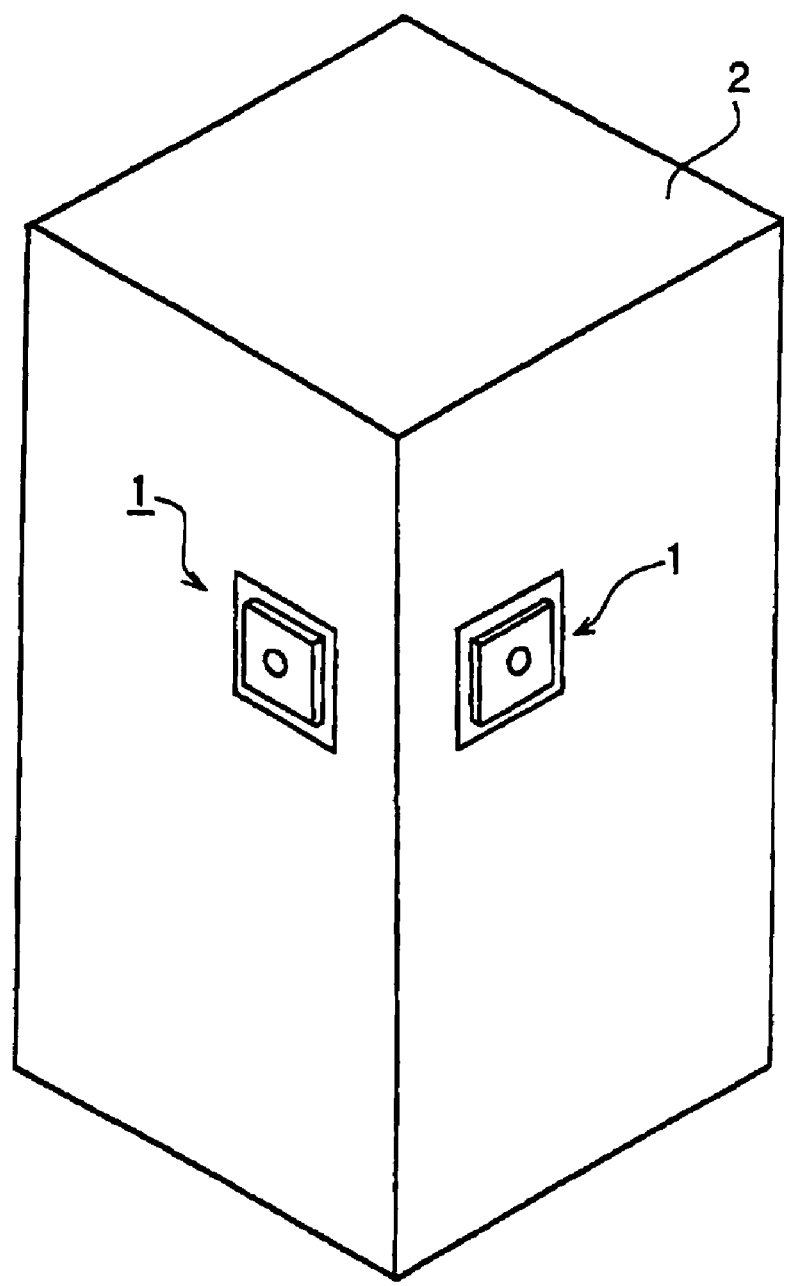
FIG. 21 is a schematic perspective view showing an object tilt and fall detection apparatus attached to a box body.
Figure 22:
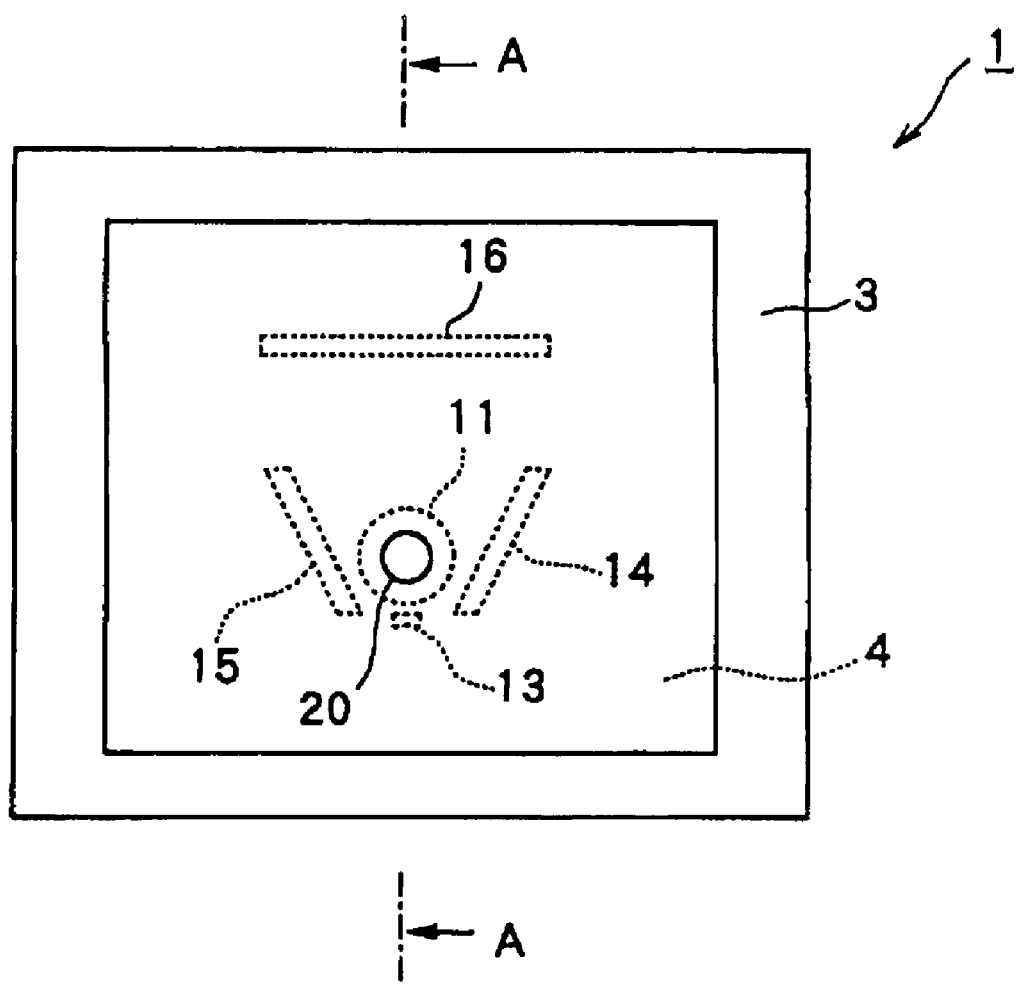
FIG. 22 is a front view of a conventional object tilt and fall detection apparatus.
Figure 23:
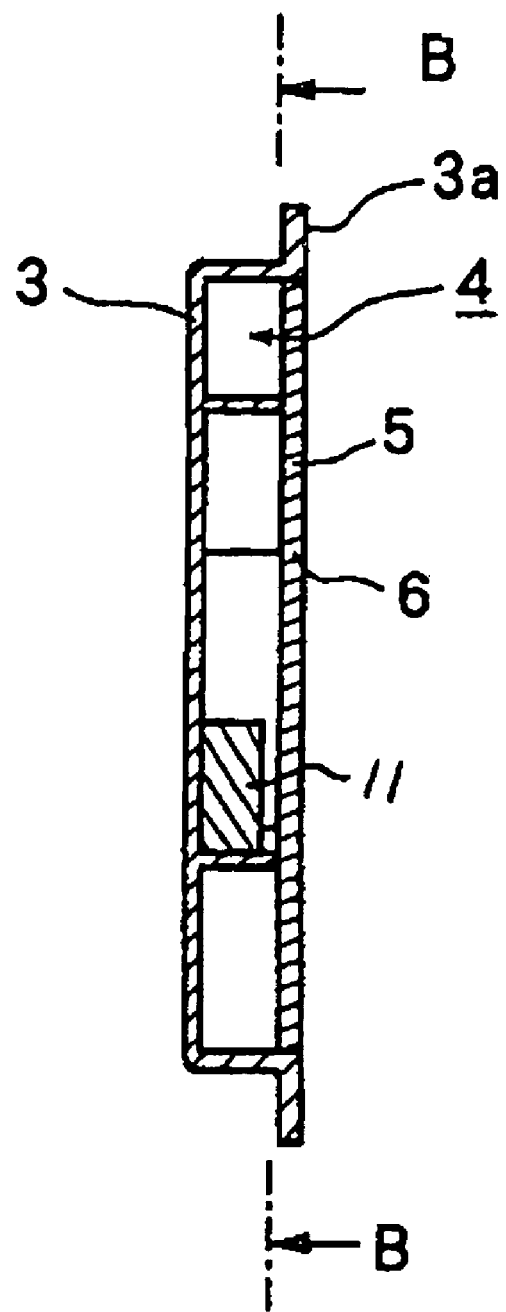
FIG. 23 is a sectional view taken along A-A in FIG. 22.
Figure 24:
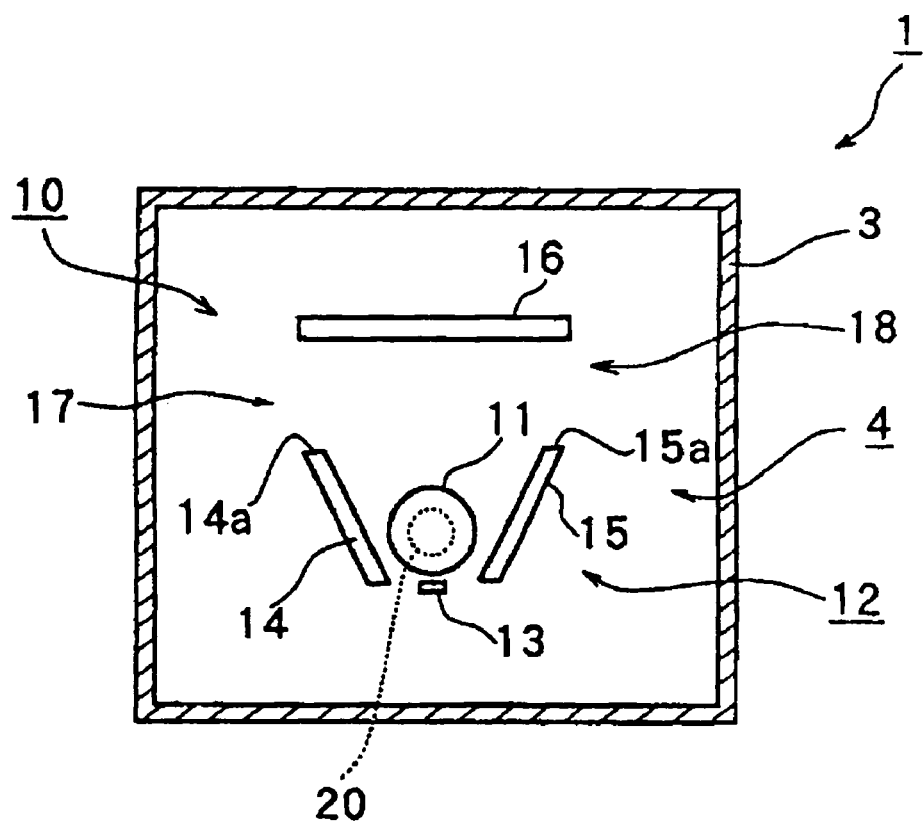
FIG. 24 is a sectional view taken along B-B in FIG. 23.
Figure 25:
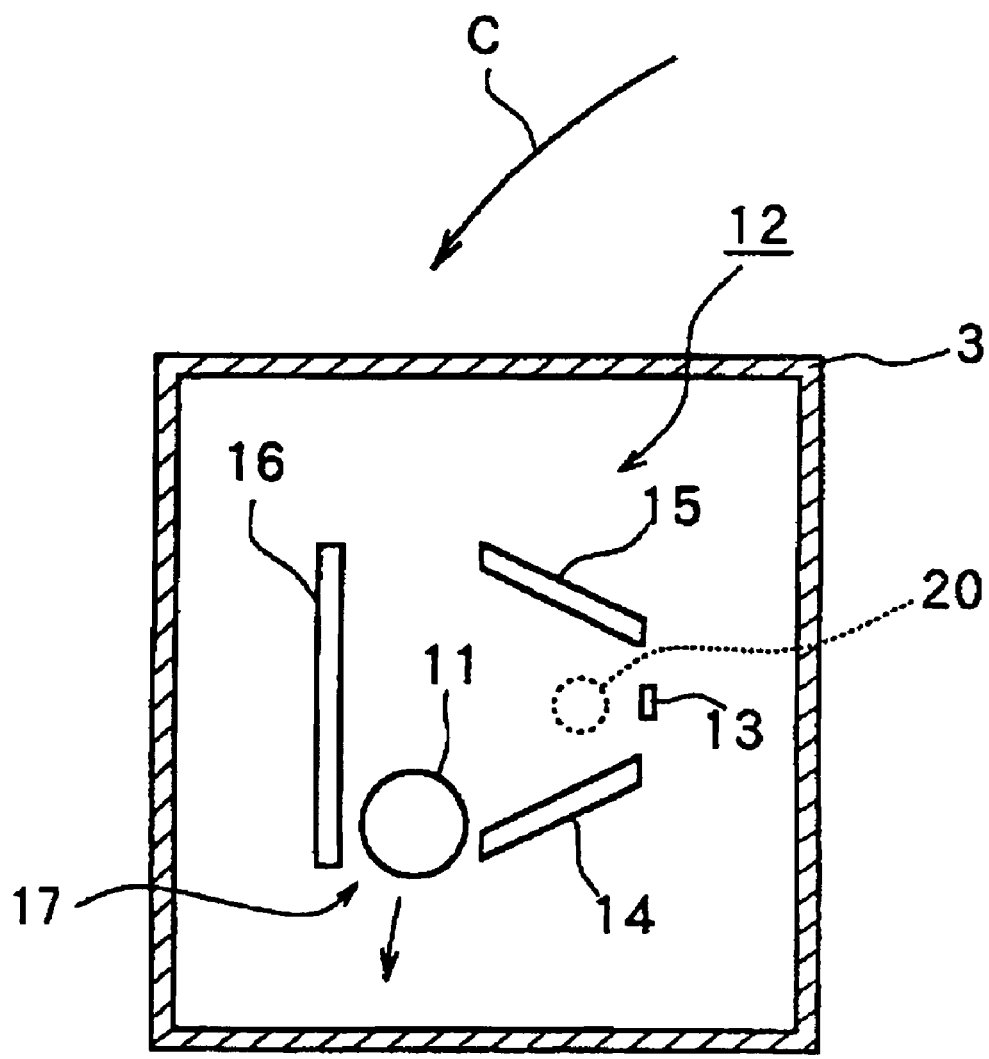
FIG. 25 is a sectional view showing the main parts of an action of the conventional object tilt and fall detection apparatus.
Figure 26:
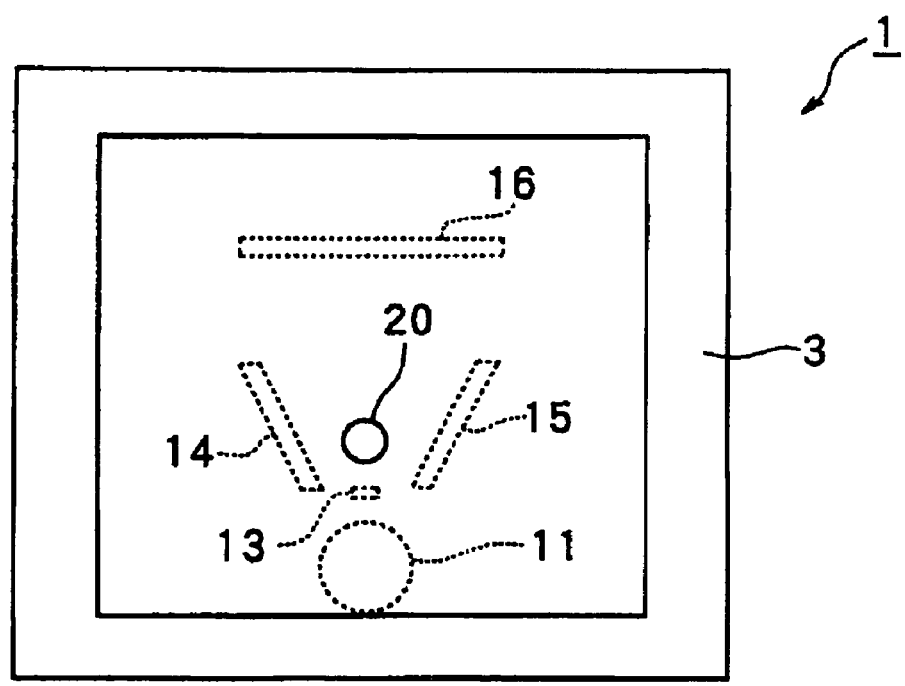
FIG. 26 is a front view of the conventional object tilt and fall detection apparatus.

Adhering means 34 such as double-sided adhesive tape, for adhering the detection apparatuses 30 to each side face of the box body 2 in FIG. 21, are provided on the rear face of the lid body 33 and a flange portion 31a of the main body 31.

Note that the main body 31 and lid body 33 described above are formed from a synthetic resin such as plastic.

Figure 3:
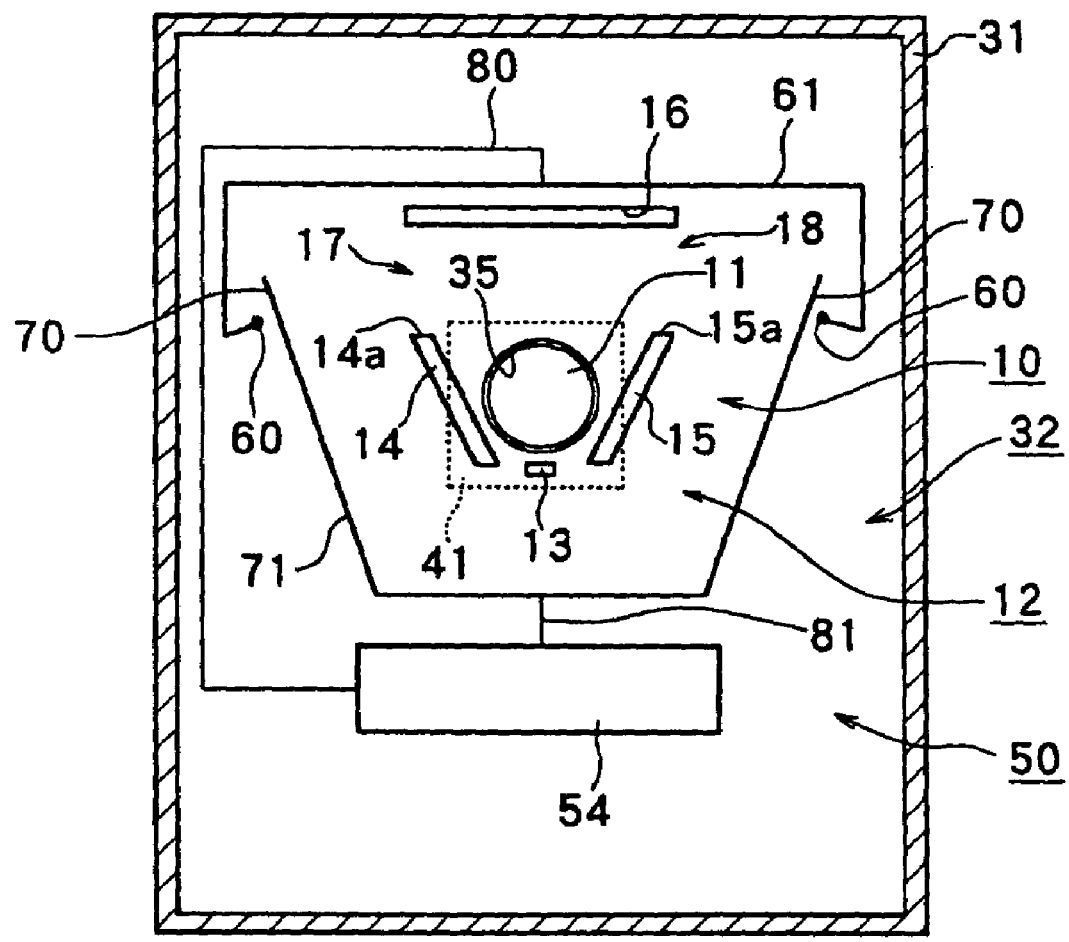
FIG. 3 is a sectional view taken along a line E-E of FIG. 2.

As shown in FIG. 3, which is a sectional view taken along a line E-E of FIG. 2, similar tilt detection means 10 to those of the conventional example, for detecting a tilted state of the main body 31, are disposed inside the recessed portion 32 of the main body 31.

The tilt detection means 10 are constituted by a disk body 11 which rolls in accordance with the tilted state of the main body 31, and a guide member 12 for guiding the disk body 11. This guide member 12 is also constituted by a reference guide 13 which supports the disk body 11 from below when the disk body 11 is in its initial position, a pair of tilt guides 14, 15 for guiding the rolling motion of the disk body 11 when the main body 31 tilts to the left or right, and a restriction guide 16 which prevents the disk body 11 from moving a fixed distance or more.

Discharge ports 17, 18 through which the disk body 11 may roll are formed between the restriction guide 16 and respective tip ends 14a, 15a of the pair of tilt guides 14, 15.

The disk body 11 is formed from a metal plate, and each of the guides 13, 14, 15, 16 comprises a rib formed integrally with the main body 31.

A hole 35 having a slightly larger diameter than the disk body 11 is formed in a region of the central portion of the main body 31 between the reference guide 13 and the pair of tilt guides 14, 15, and as shown in FIG. 2, this hole 35 is sealed by a transparent cover member 41 having a rectangular plane and provided with a recessed portion 40 for positioning and storing the disk body 11.

The cover member 41 is formed from A-PET, PVC, PP, and the like, and the recessed portion 40 for positioning and storing the disk body 11 is obtained by thermoforming these materials.

As shown in FIG. 1, timer means 50 for measuring time are disposed in the aforementioned recessed portion 32 of the main body 31.

Figure 4:
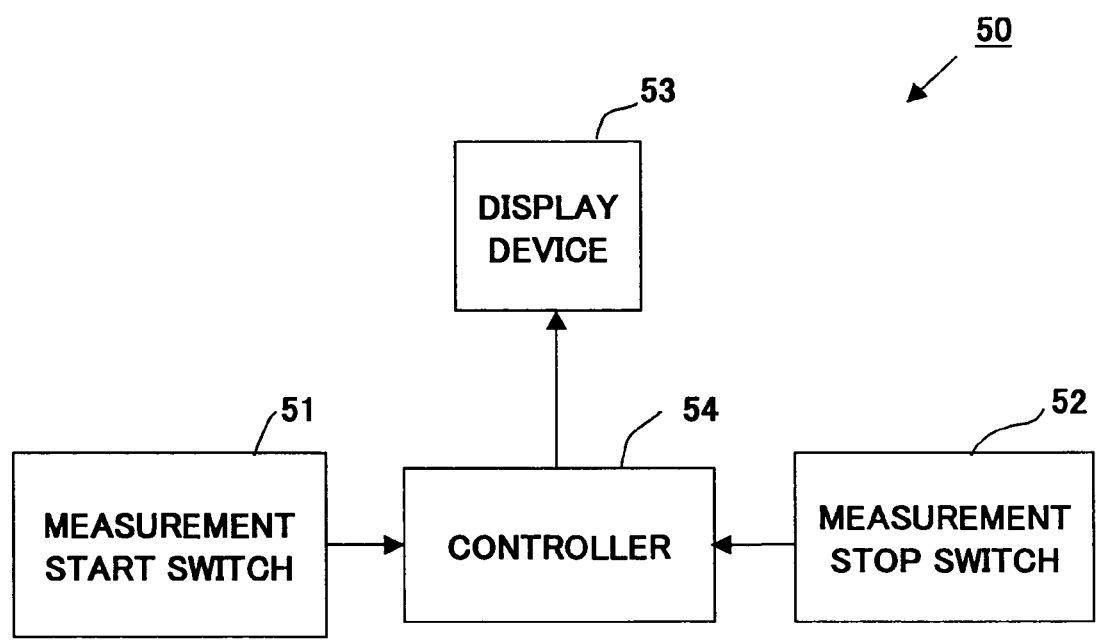
FIG. 4 is a block diagram of timer means.

As shown in the block diagram in FIG. 4, the timer means 50 are constituted by a measurement start switch 51 for transmitting a time measurement start signal, a measurement stop switch 52 for transmitting a time measurement stop signal, and a controller 54 for starting time measurement on the basis of the measurement start signal from the measurement start switch 51, stopping time measurement on the basis of the measurement stop signal from the measurement stop switch 52, and causing a display device 53 to display chronological variation in the time from the measurement start time to the measurement stop time.

Note that a power source or the like for supplying power to the display device 53 is disposed within the controller 54.

As shown in FIG. 3, the measurement stop switch 52 for transmitting the time measurement stop signal comprises a first switch lead 61 having an inverse C shape and formed with a pair of contact terminals 60 at each end, and a second switch lead 71 having a substantially reverse C shape and formed at each end with movable terminals 70 which contact the contact terminals 60 elastically. The movable terminals 70 and contact terminals 60 are disposed facing the discharge ports 17, 18 of the tilt detection means 10.

The first and second switch leads 61, 71 are connected to the controller 54 via lead wires 80, 81.

As shown in FIG. 2, the display device 53 is formed by a liquid crystal panel or the like, and disposed on a transparent portion 31b provided within the recessed portion 32 of the main body 31, which can be checked from the front face of the main body 31. As shown in FIGS. 1, 2, the measurement start switch 51 for transmitting the time measurement start signal to the controller 54 is provided on a part of the display device 53.

As shown in FIG. 2, the display device 53 and controller 54 are connected by a lead wire 83.

Next, an action of the above detection apparatus 30 will be described.

First, an operator adheres the detection apparatus 30 to each side face of the box body 2 shown in FIG. 21. Next, as shown in FIG. 5, by pressing the transparent cover member 41 for positioning and storing the disk body 11 in the direction of the arrow, the disk body 11 positioned and stored in the recessed portion 40 of the cover member 41 moves through the hole 35 to a region surrounded by the reference guide 13 and the pair of tilt guides 14, 15, as shown in FIG. 5 and the line F-F cross section of FIG. 5, which is shown in FIG. 6.

Once this operation is complete, the operator operates the measurement start switch 51 shown in FIG. 1, whereby the current time, for example Sep. 11, 2002, 12:13 as the month, day, year, hour, and minute, is displayed on the display device 53.

Note that it is sufficient for chronological time variation to be displayed on the display device 53, and therefore only the elapsed time, rather than the historical time variation described above, need be displayed.

Figure 5:
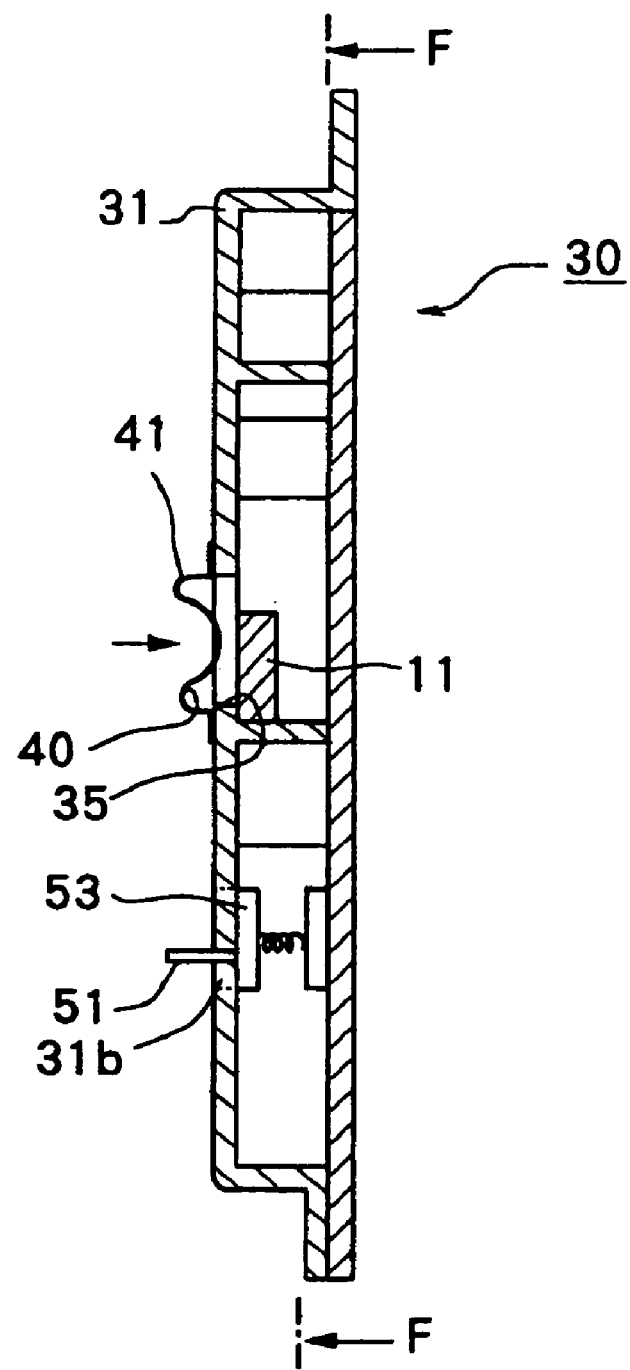
FIG. 5 is a schematic sectional view of the object tilt and fall detection apparatus according to the first embodiment.
Figure 6:
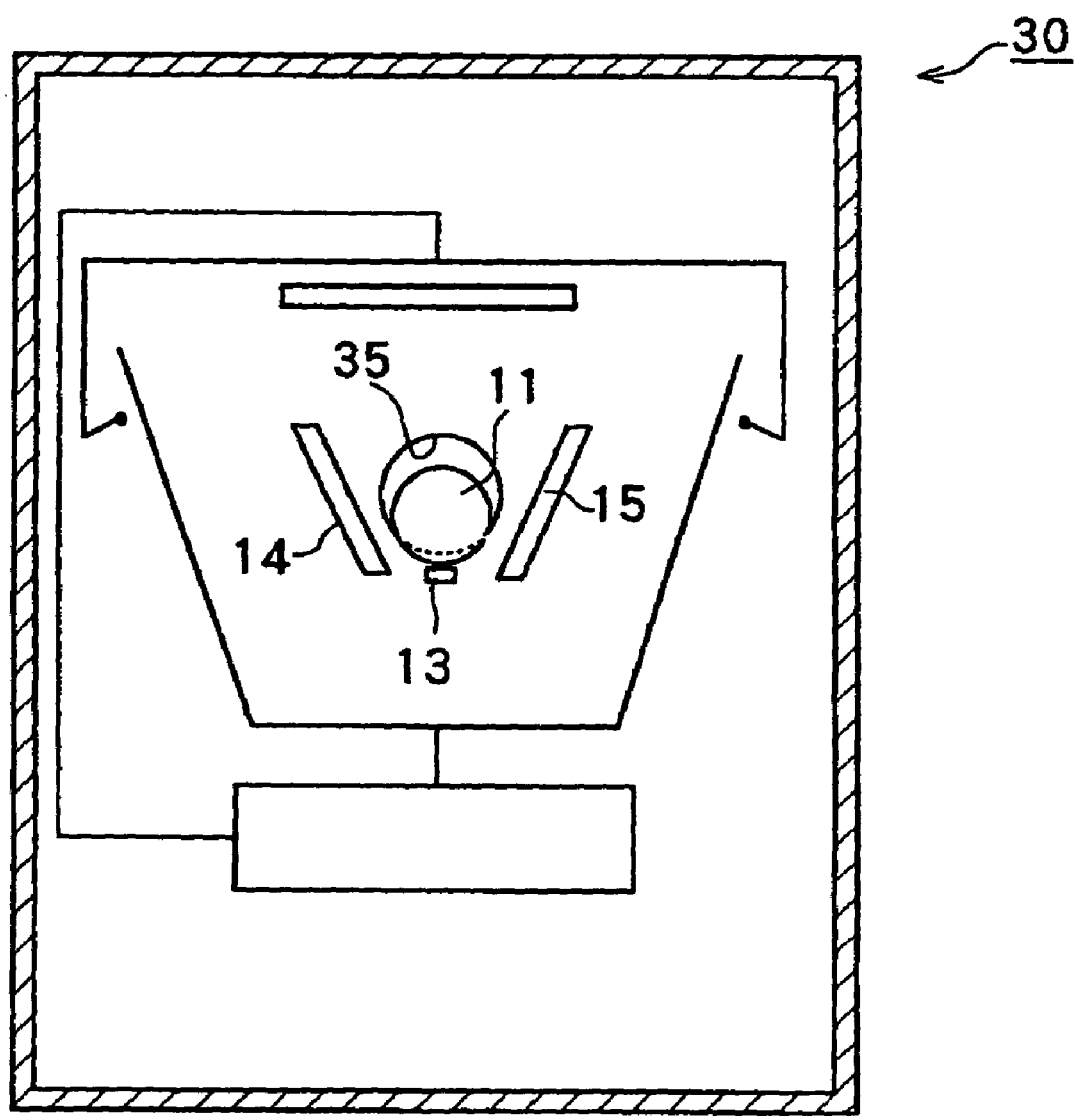
FIG. 6 is a sectional view taken along a line F-F of FIG. 5.

The current time display on the display device 53, can be checked easily through the transparent portion 31b on the front face of the main body 31 shown in FIG. 5.

Figure 7:
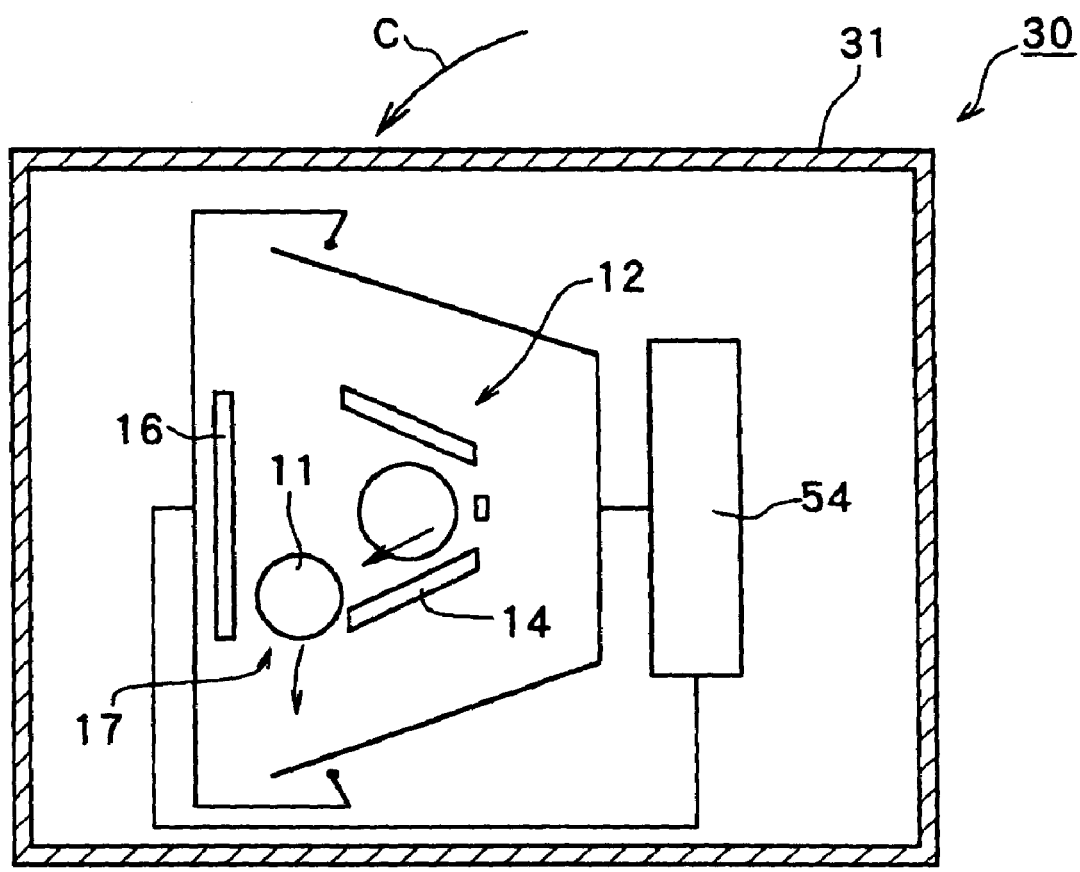
FIG. 7 is a sectional view showing the main parts of an action of the object tilt and fall detection apparatus according to the first embodiment.

If the box body 2 falls over for some reason during transportation of the box body 2 after this initial preparation operation is complete, the main body 31 of the detection apparatus 30 adhered to the box body 2 tilts simultaneously in the direction of an arrow C, as shown in FIG. 7.

When the main body 31 of the detection apparatus 30 tilts in the direction of the arrow C in this manner, the disk body 11 rolls from its initial position, shown in FIG. 6, along the tilt guide 14, and falls down through the discharge port 17 between the tilt guide 14 and restriction guide 16, as shown in FIG. 7.

Figure 8:
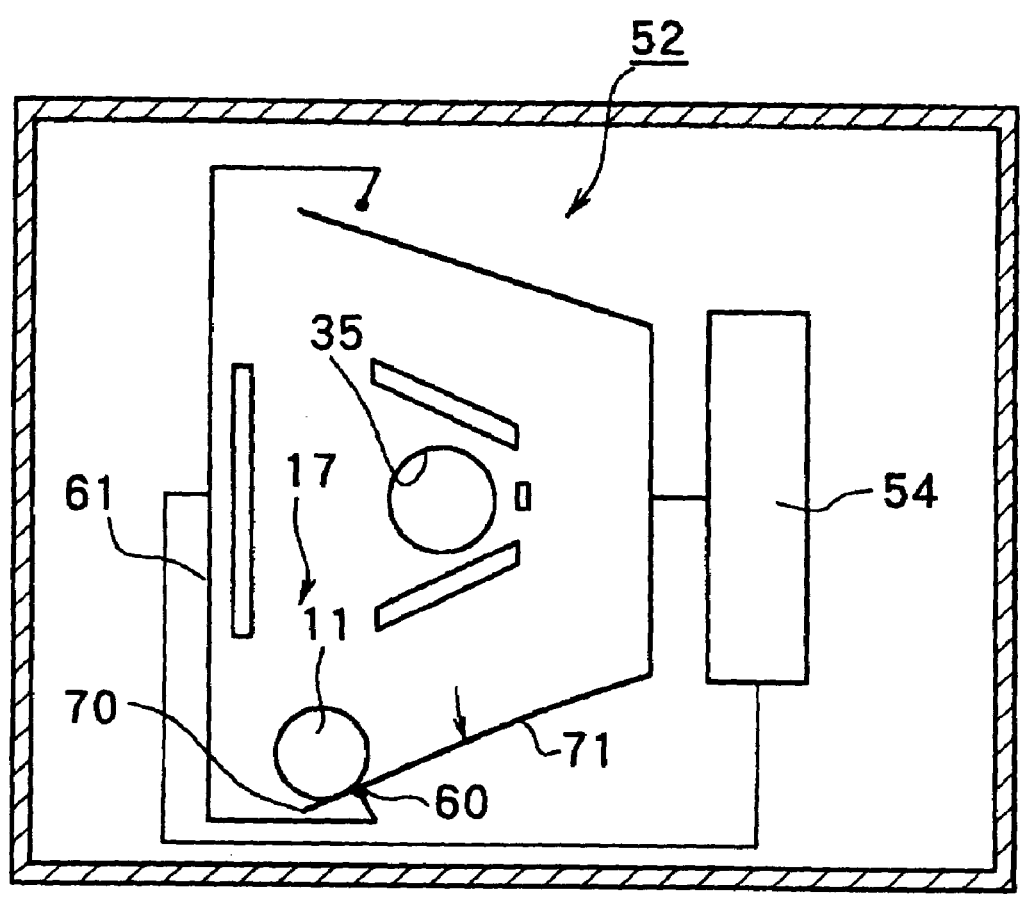
FIG. 8 is a sectional view showing the main parts of the action of the object tilt and fall detection apparatus according to the first embodiment.

When the disk body 11 falls through the discharge port 17 of the restriction guide 12 in this manner, the disk body 11 contacts the movable terminal 70 of the second switch lead 71 constituting the measurement stop switch 52, thereby bending the movable terminal 70 downward as shown in FIG. 8. As a result, the movable terminal 70 abuts against the contact terminal 60 of the first switch lead 61.

When the movable terminal 70 of the measurement stop switch 52 abuts against the contact terminal 60 in this manner, the time measurement stop signal is transmitted to the controller 54, whereby the controller 54 stops time measurement immediately and displays the time at which measurement was stopped (Sep. 15, 2002, 19:08, for example) on the display device 53.

Meanwhile, the disk body 11, having fallen through the discharge port 17 between the tilt guide 15 and restriction guide 17, moves to a position in which it cannot be seen through the hole 35.

Figure 9:
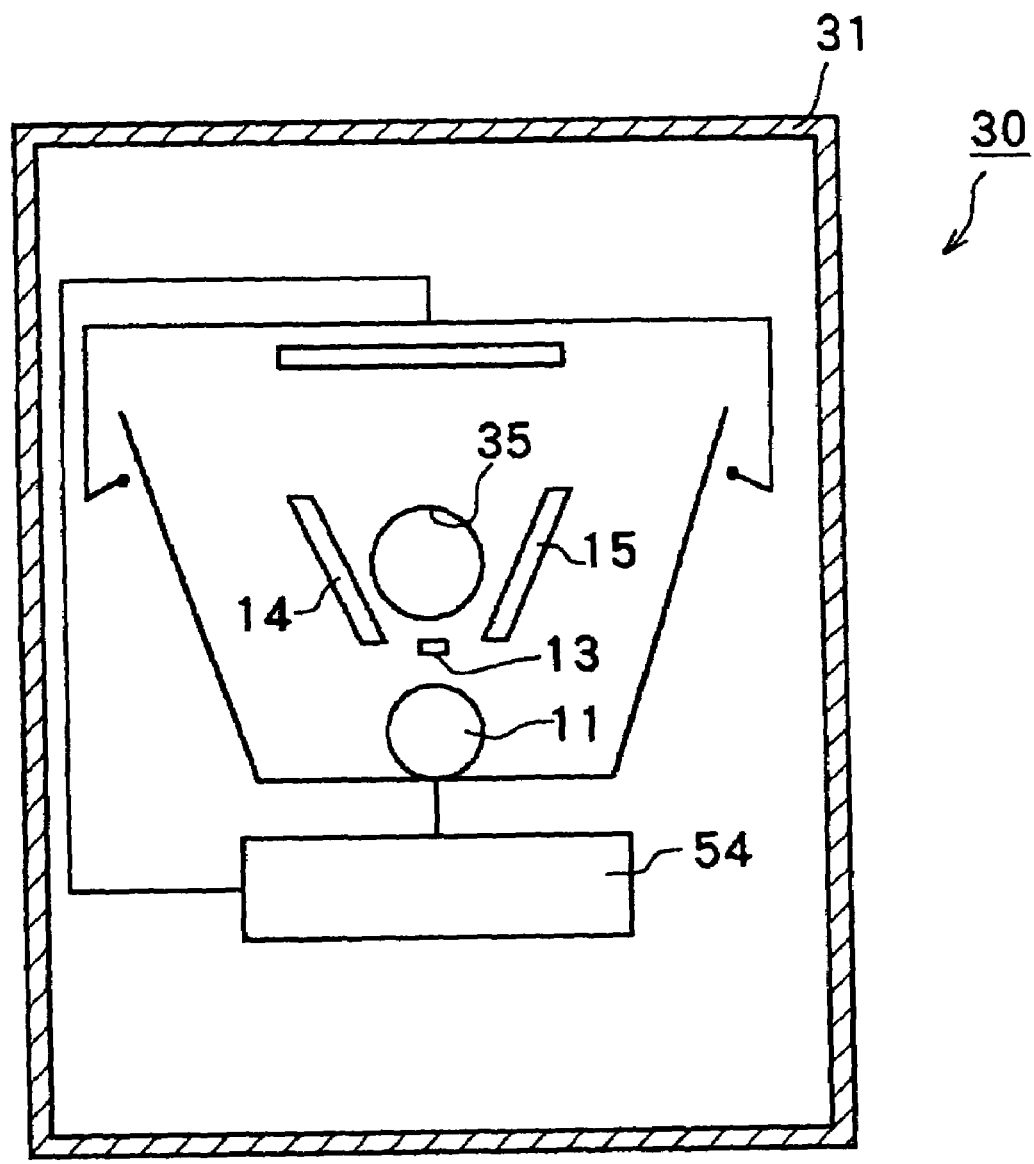
FIG. 9 is a sectional view showing the main parts of the action of the object tilt and fall detection apparatus according to the embodiment

Even when the fallen box body 2 is subsequently returned to its initial position such that the main body 31 of the detection apparatus 30 is returned to its initial position shown in FIG. 9, the disk body 11 does not return to its initial position restricted between the reference guide 13 and the pair of tilt guides 14, 15, and hence the disk body 11 cannot be seen through the hole 35.

Figure 10:
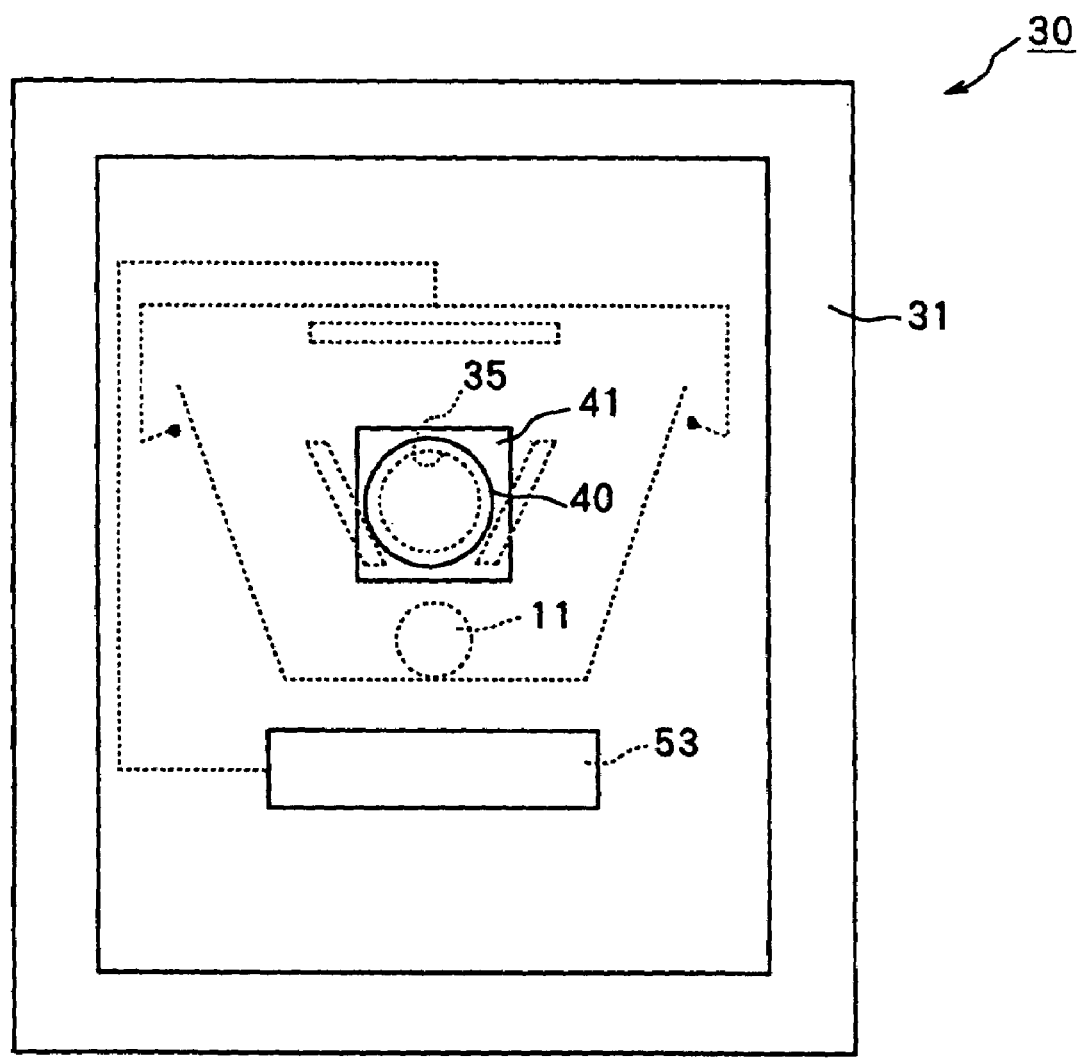
FIG. 10 is a front view showing the action of the object tilt and fall detection apparatus according to the embodiment.

Hence, as shown in FIG. 10, even when the box body 2 is returned to its original position after tilting or falling, the operator is unable to confirm the existence of the disk body 11 from the hole 35 in the detection apparatus 30 by looking through the hole 35, and therefore the operator is able to confirm definitively that the box body 2 has fallen once. Further, by looking at the display screen of the display device 53, on which the time at which time measurement was stopped (Sep. 15, 2002, 19:08, for example) is displayed, the operator is also able to confirm definitively the time at which the box body 2 fell.

Next, an object tilt and fall detection apparatus according to a second embodiment of this application will be described.

Figure 11:
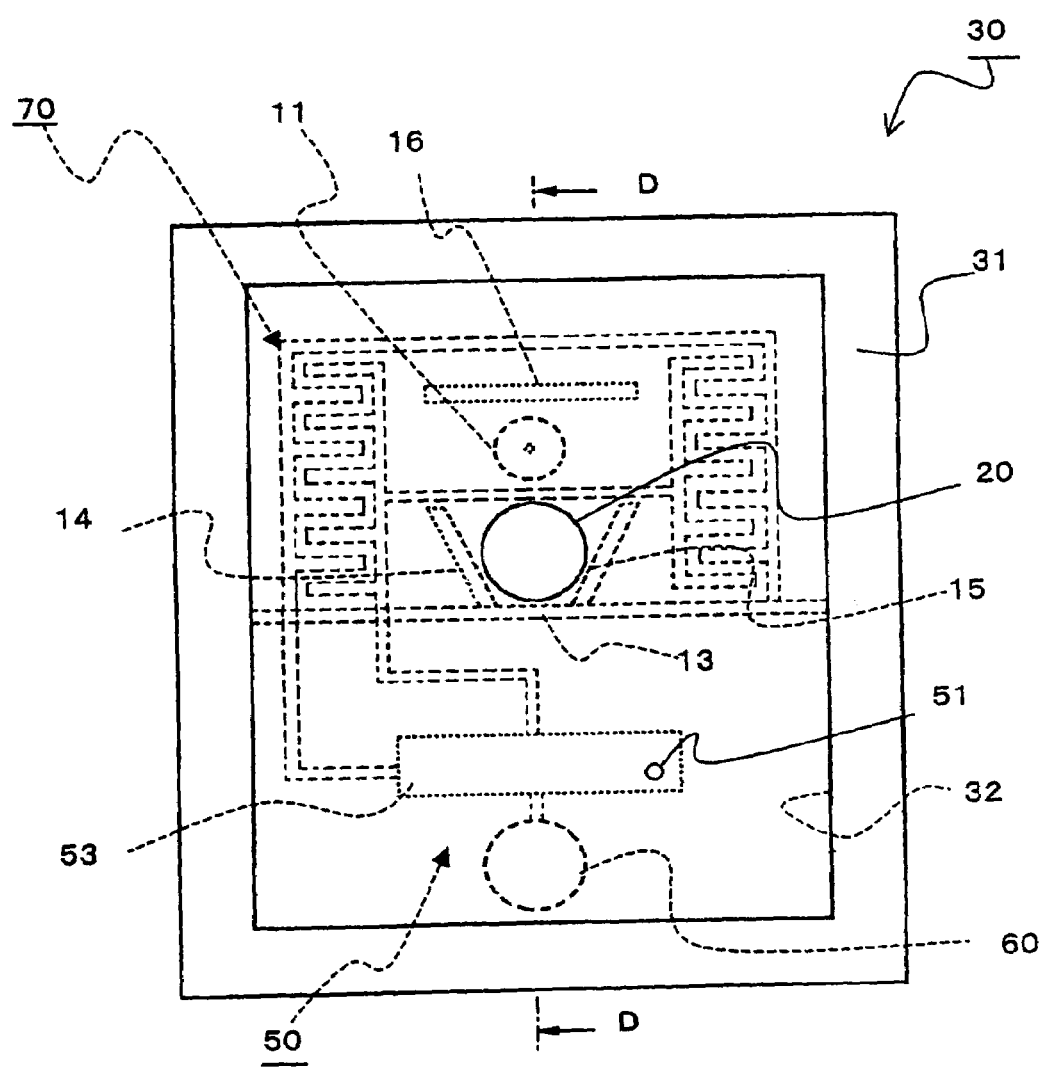
FIG. 11 is a schematic front view of an object tilt and fall detection apparatus according to a second embodiment of this application.

FIG. 11 is a front view of an object tilt and fall detection apparatus 30 according to the second embodiment. Identical parts to those shown in FIGS. 21 through 26 are illustrated with identical reference symbols.

Figure 12:
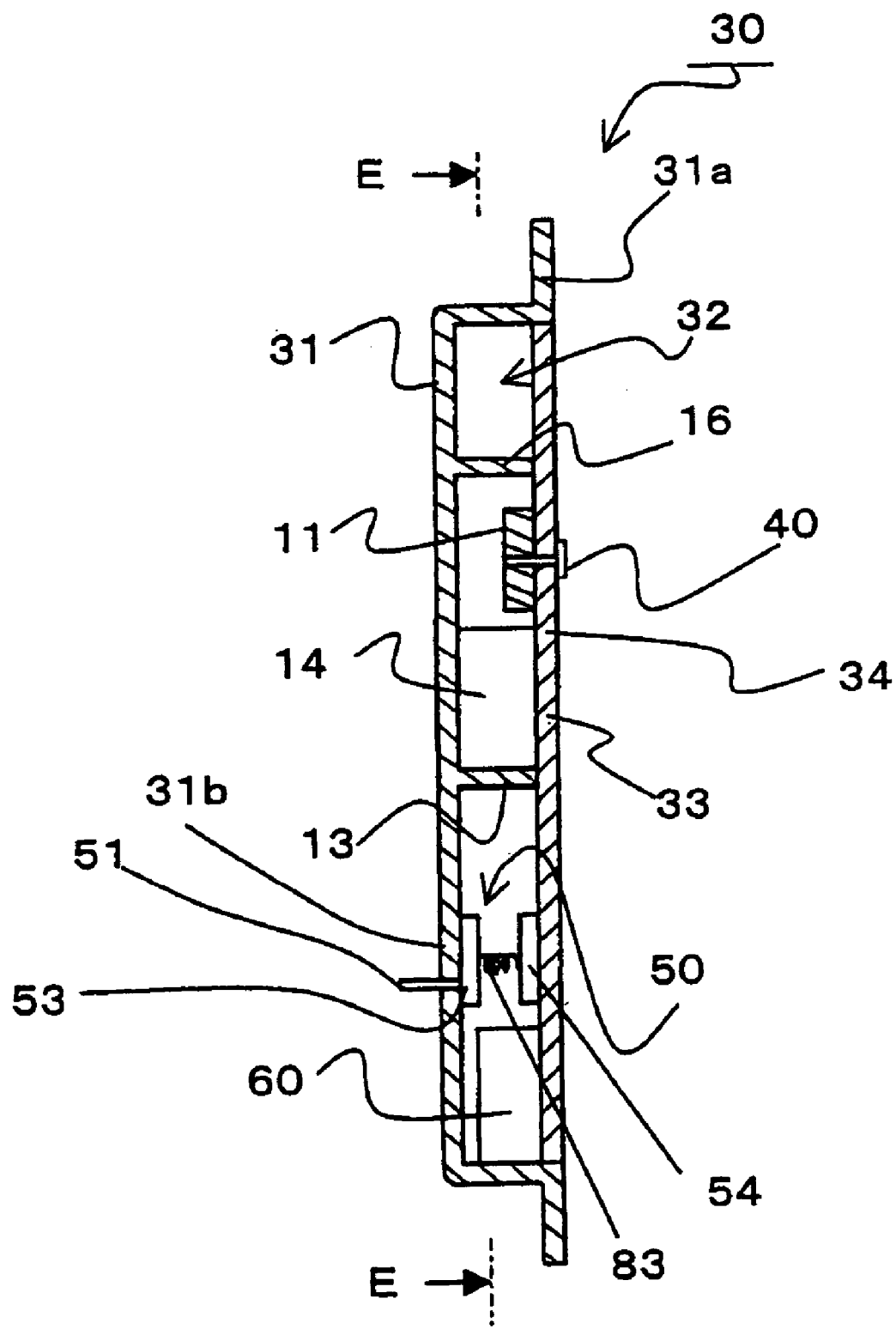
FIG. 12 is a sectional view taken along a line D-D in FIG. 11.

As shown in the front view of FIG. 11 and the schematic sectional view taken along a line D-D shown in FIG. 12, this object tilt and fall detection apparatus (to be referred to simply as "detection apparatus" hereafter) 30 is also constituted by a main body 31 having a rectangular front face and a recessed portion 32 formed with a C-shaped cross section, and a lid body 33 covering the recessed portion 32 from the rear face, as in the conventional example.

Adhering means 34 such as double-sided adhesive tape, for adhering the detection apparatuses 30 to each side face of the box body 2 in FIG. 21, are provided on the rear face of the lid body 33 and a flange portion 31a of the main body 31.

Note that the main body 31 and lid body 33 described above are formed from a synthetic resin such as plastic.

Figure 13:
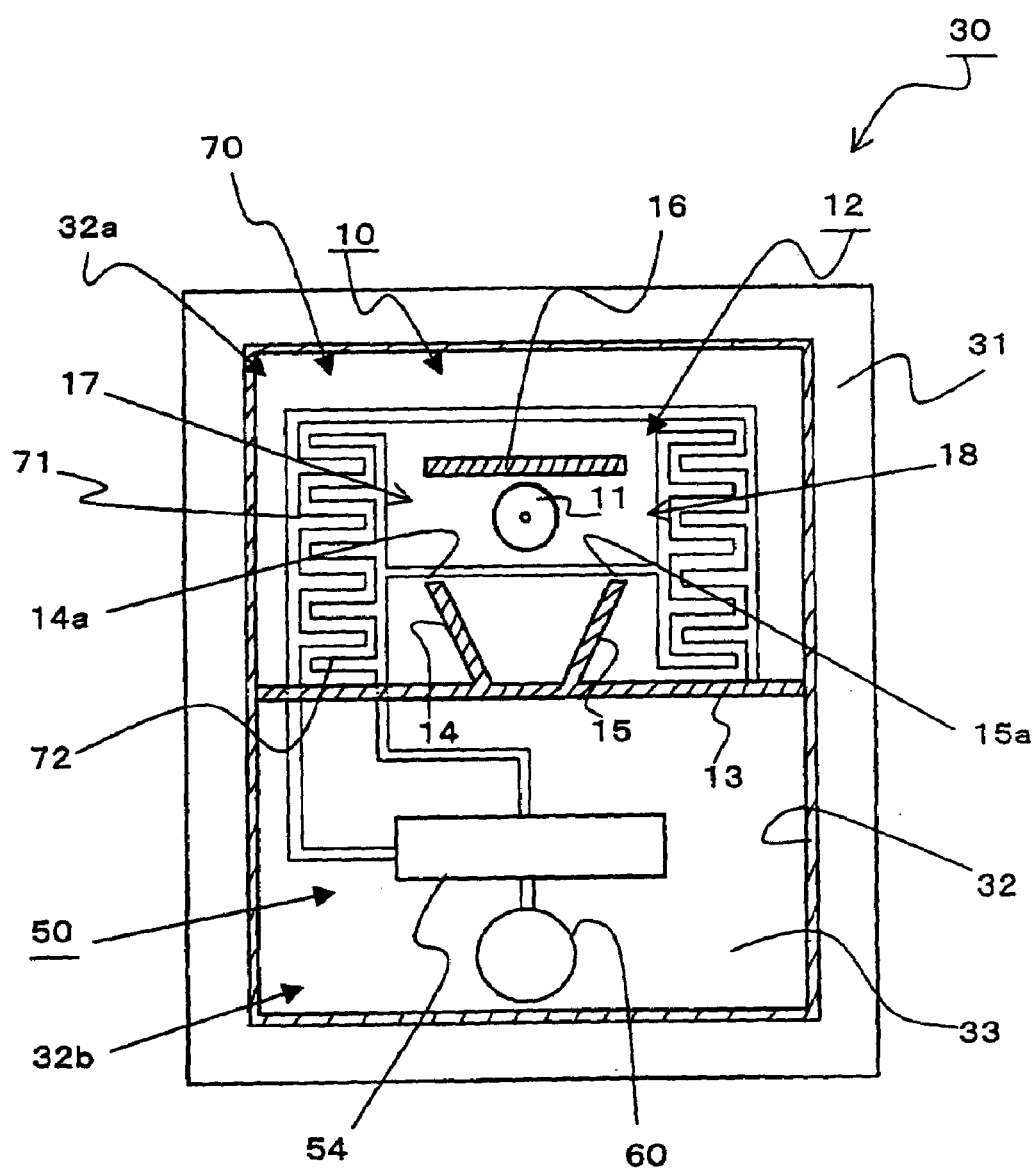
FIG. 13 is a sectional view taken along a line E-E in FIG. 12.

As shown in FIG. 13, which is a sectional view taken along a line E-E of FIG. 12, similar tilt detection means 10 to those of the conventional example, for detecting a tilted state of the main body 31, are disposed inside the recessed portion 32 of the main body 31.

The tilt detection means 10 are constituted by a disk body 11 which rolls in accordance with the tilted state of the main body 31, and a guide member 12 for guiding the disk body 11. This guide member 12 is also constituted by a reference guide 13 which supports the disk body 11 from below when the disk body 11 is in its initial usage position, a pair of tilt guides 14, 15 for guiding the rolling motion of the disk body 11 when the main body 31 tilts to the left or right, and a restriction guide 16 which prevents the disk body 11 from moving a fixed distance or more. Note that the reference guide 13 of this embodiment is formed along the entire width direction of the recessed portion 32 formed in the main body 31 such that the recessed portion 32 is divided into an upper portion 32a and a lower portion 32b.

Similar discharge ports 17, 18 to those of the conventional example, which allow the rolling disk body 11 to be discharged, are formed between the two end portions of the restriction guide 16 and respective tip ends 14a, 15a of the pair of tilt guides 14, 15.

In this embodiment, the disk body 11 is formed from a metal plate having good electric conductivity, and each of the guides 13, 14, 15, 16 comprises a rib formed integrally with the main body 31.

As shown in FIG. 12, when the object tilt and fall detection apparatus 30 is not in use, the disk body 11 described above is positioned and supported in a region of the lid body 33 surrounded by the reference guide 13 and the pair of tilt guides 14, 15 by a temporary locking pin 40 inserted into the disk body 11 such that movement of the disk body 11 is restrained.

Note that the temporary stopping position of the disk body 11 when not in use is not limited to this embodiment, and the disk body 11 may be restrained by the temporary locking pin 40 on the main body 31 side. Naturally in this case also, the disk body 11 is positioned and supported in a region of the main body 31 surrounded by the reference guide 13 and the pair of tilt guides 14, 15 by the temporary locking pin 40 inserted into the disk body 11 such that movement of the disk body 11 is restrained.

As shown in FIG. 11, timer means 50 for measuring time are disposed in the aforementioned recessed portion 32 of the main body 31.

Figure 14:
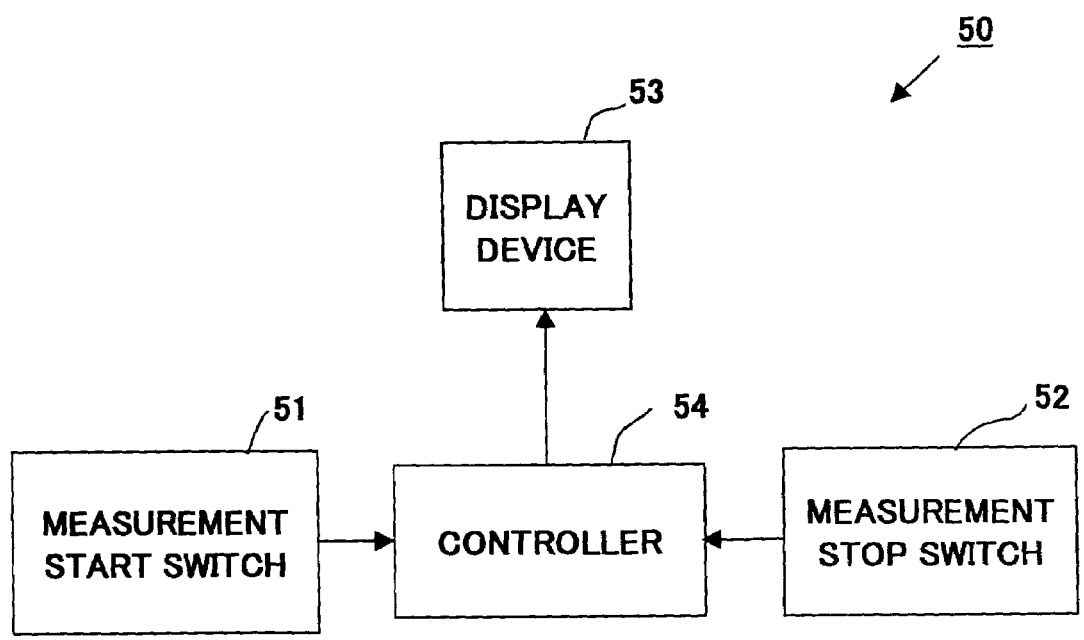
FIG. 14 is a block diagram showing timer means.

As shown in the block diagram in FIG. 14, the timer means 50 are constituted by a measurement start switch 51 for transmitting a time measurement start signal, a measurement stop switch 52 for transmitting a time measurement stop signal, and a controller 54 for starting time measurement on the basis of the measurement start signal from the measurement start switch 51, stopping time measurement on the basis of the measurement stop signal from the measurement stop switch 52, and causing a display device 53 to display chronological variation in the time from the measurement start time to the measurement stop time.

The reference numeral 60 in FIGS. 11, 13 denotes a small power source 60 (a lithium ion battery, for example) for supplying power to the controller 54, display device 53, and so on.

As shown in FIG. 13, the measurement stop switch 52 for transmitting the time measurement stop signal is formed by a printed wiring pattern group 70 formed on the lid body 33 which covers the main body 31 from the rear face.

The printed wiring pattern group 70 comprises a pair of printed wiring patterns 71, 72 opposing each other at a predetermined interval without intersecting.

The pair of printed wiring patterns 71, 72 of the embodiment shown in FIG. 13 is formed opposite the discharge ports 17, 18 of the tilt detection means 10 in a meandering, substantially reverse C shape, and one end thereof is connected to the controller 54 of the timer means 50.

Note that in this embodiment, the printed wiring pattern group 70 comprises the pair of printed wiring patterns 71, 72, but it goes without saying that the printed wiring pattern group 70 is not limited to this embodiment, and may be constituted by more than a pair of printed wiring patterns. Furthermore, the patterns are not limited to a meandering form, and any form, such as a simple linear form, may be considered.

As shown in FIG. 12, the display device 53 is formed by a liquid crystal panel or the like, and disposed on a transparent portion 31b provided within the recessed portion 32 of the main body 31, which can be checked from the front face of the main body 31, thereby the display device can be easily checked from the outside. Further, as shown in FIGS. 11, 12, the measurement start switch 51 for transmitting the time measurement start signal to the controller 54 is provided on a part of the display device 53.

As shown in FIG. 12, the display device 53 and controller 54 are connected by a lead wire 83.

Next, an action of the above detection apparatus 30 will be described.

Figure 15:
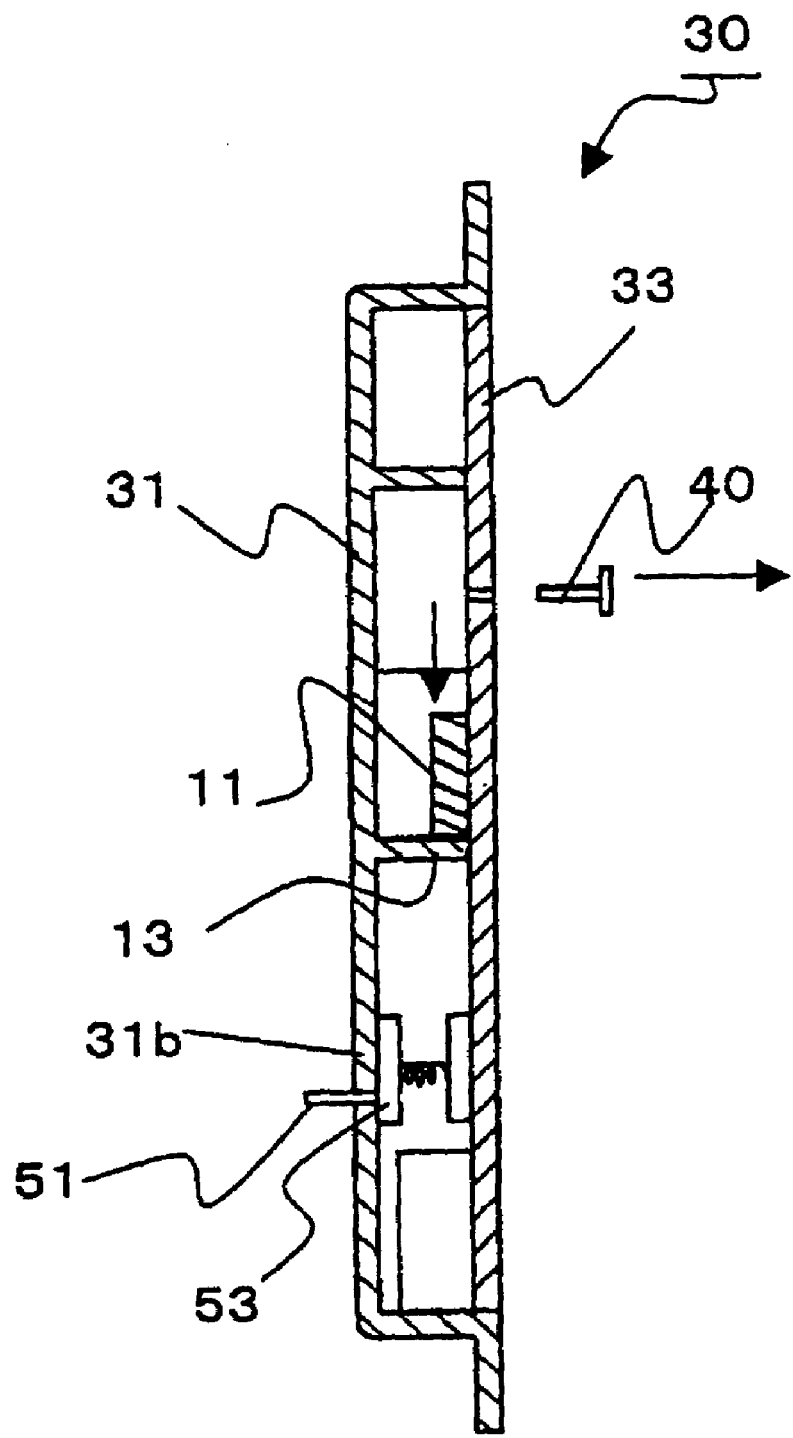
FIG. 15 is a schematic sectional view showing an operating sequence of the object tilt and fall detection apparatus according to the second embodiment.
Figure 16:
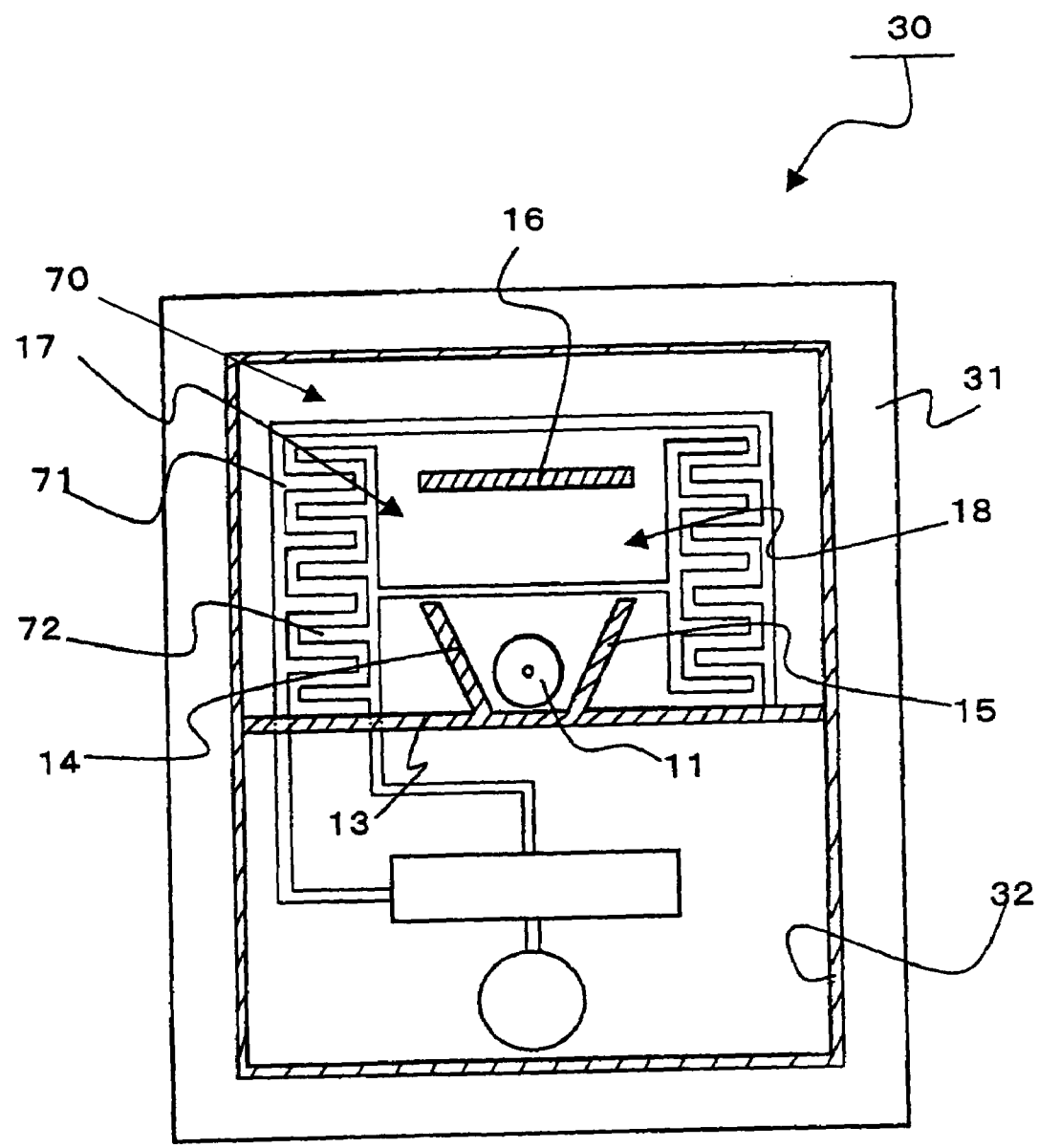
FIG. 16 is a schematic sectional view showing an action of the object tilt and fall detection apparatus according to the second embodiment.

First, as shown in FIG. 15, the operator pulls out the temporary locking pin 40 inserted into the disk body 11 such that the disk body 11, which was temporarily locked, falls into the region surrounded by the reference guide 13 and the pair of tilt guides 14, 15, as shown in FIG. 16.

The detection apparatus 30 is then adhered to each side face of the box body 2 shown in FIG. 21.

Once this operation is complete, the operator operates the measurement start switch 51 shown in FIG. 11, whereby the current time, for example May 12, 2003, 14:13 as the month, day, year, hour, and minute, is displayed on the display device 53.

Note that it is sufficient for chronological time variation to be displayed on the display device 53, and therefore only the elapsed time, rather than the historical time variation described above, need be displayed.

The current time display on the display device 53 can be checked easily through the transparent portion 31b on the front face of the main body 31 shown in FIG. 15.

Figure 17:
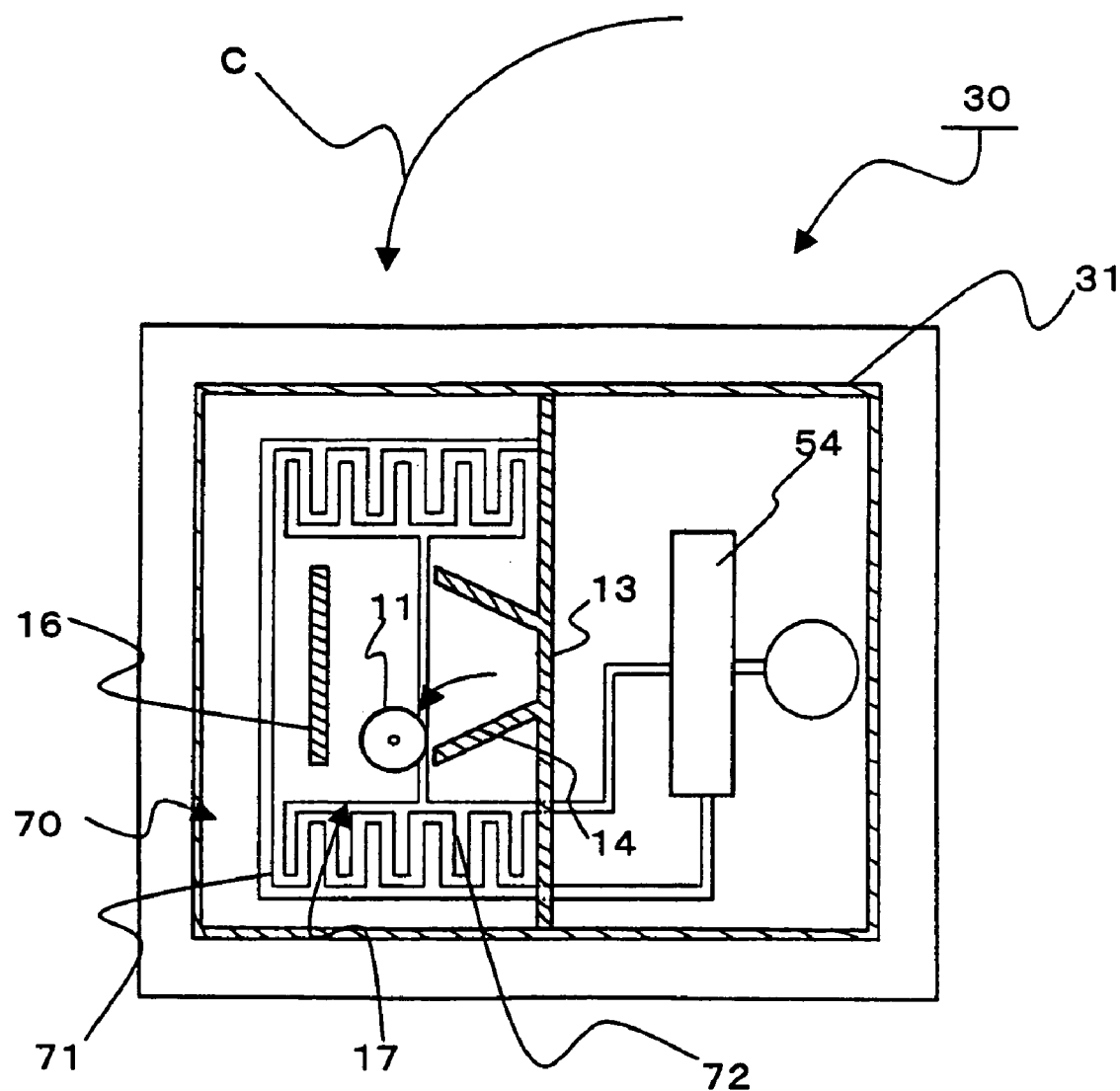
FIG. 17 is a schematic sectional view showing the action of the object tilt and fall detection apparatus according to the second embodiment.

If the box body 2 falls over for some reason during transportation of the box body 2 after this initial preparation operation is complete, the main body 31 of the detection apparatus 30 adhered to the box body 2 tilts simultaneously in the direction of an arrow C, as shown in FIG. 17.

When the main body 31 of the detection apparatus 30 tilts in the direction of the arrow C in this manner, the disk body 11 rolls from its initial position shown in FIG. 16 along the tilt guide 14 shown in FIG. 17, and falls down through the discharge port 17 between the tilt guide 14 and restriction guide 16.

Figure 18:
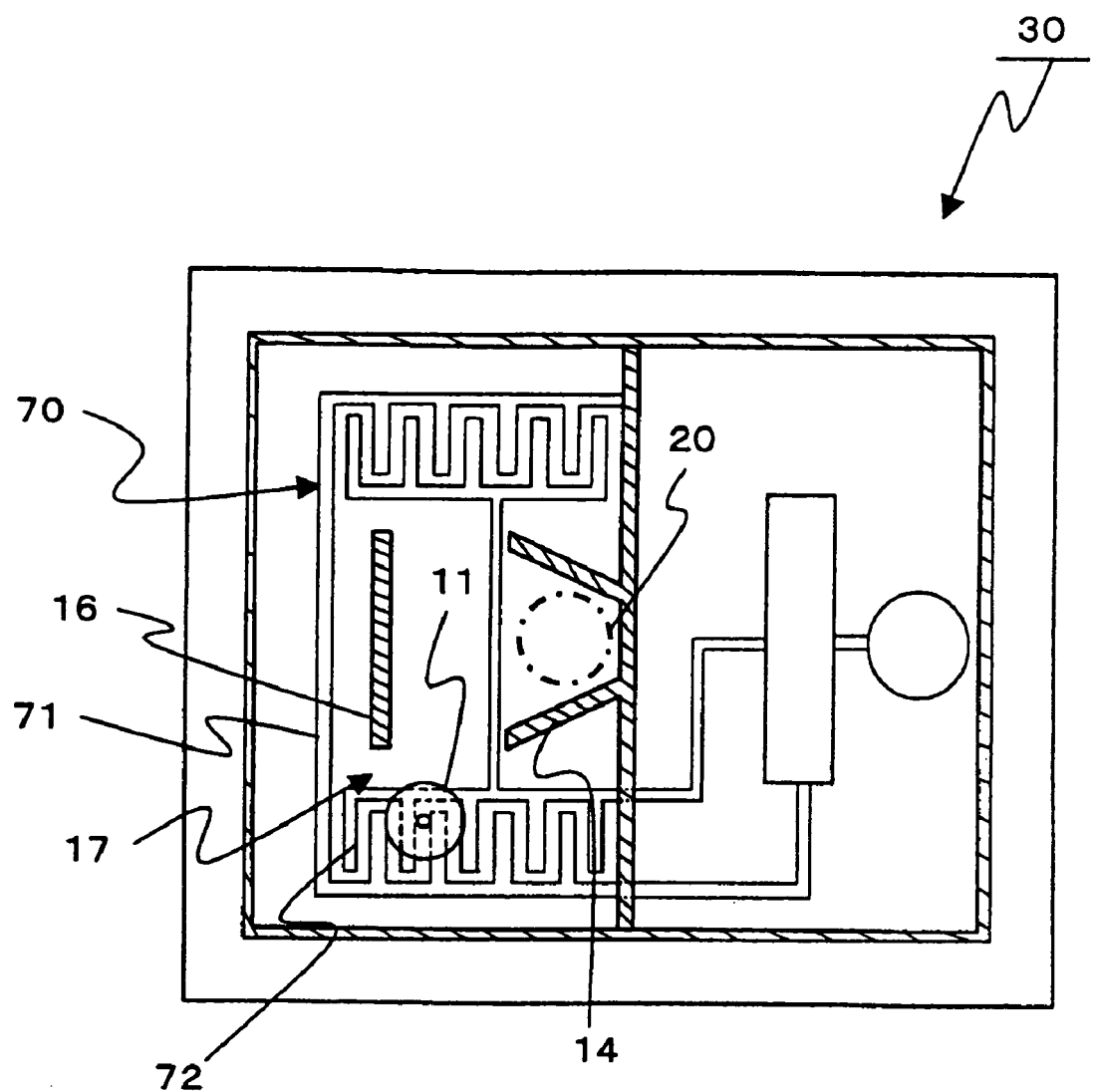
FIG. 18 is a schematic sectional view showing the action of the object tilt and fall detection apparatus according to the second embodiment.

When the disk body 11 falls through the discharge port 17 of the restriction guide 12 in this manner, the disk body 11 slides between the printed wiring patterns 71, 72 of the printed wiring pattern group 70 constituting the measurement stop switch 52, as shown in FIG. 18, whereby the two printed wiring patterns 71, 72 electrically short-circuit.

When the printed wiring patterns 71, 72 of the printed wiring pattern group 70 constituting the measurement stop switch 52 short-circuit in this manner, the time measurement stop signal is transmitted to the controller 54 shown in FIG. 14, whereby the controller 54 stops time measurement immediately and displays the time at which measurement was stopped (Sep. 15, 2003, 19:08, for example) on the display device 53.

Meanwhile, the disk body 11, having fallen through the discharge port 17 between the tilt guide 15 and restriction guide 17, moves to a position in which it cannot be seen through the transparent part 20.

Figure 19:
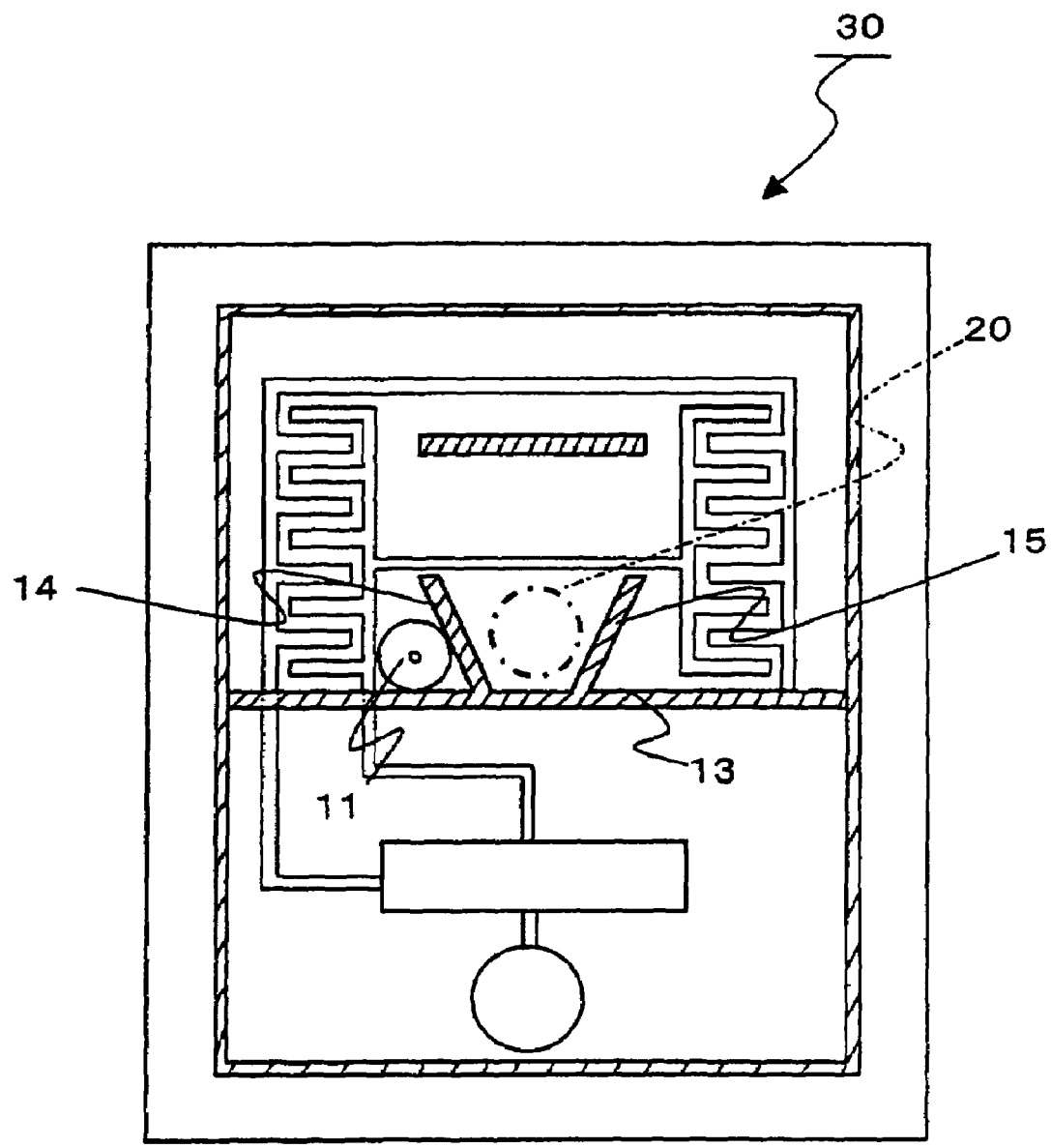
FIG. 19 is a schematic sectional view showing the action of the object tilt and fall detection apparatus according to the second embodiment.

Even when the fallen box body 2 is subsequently returned to its initial position such that the main body 31 of the detection apparatus 30 is returned to its initial position shown in FIG. 19, the disk body 11 does not return to its initial position restricted between the reference guide 13 and the pair of tilt guides 14, 15, and hence the disk body 11 cannot be seen through the transparent part 20.

Figure 20:
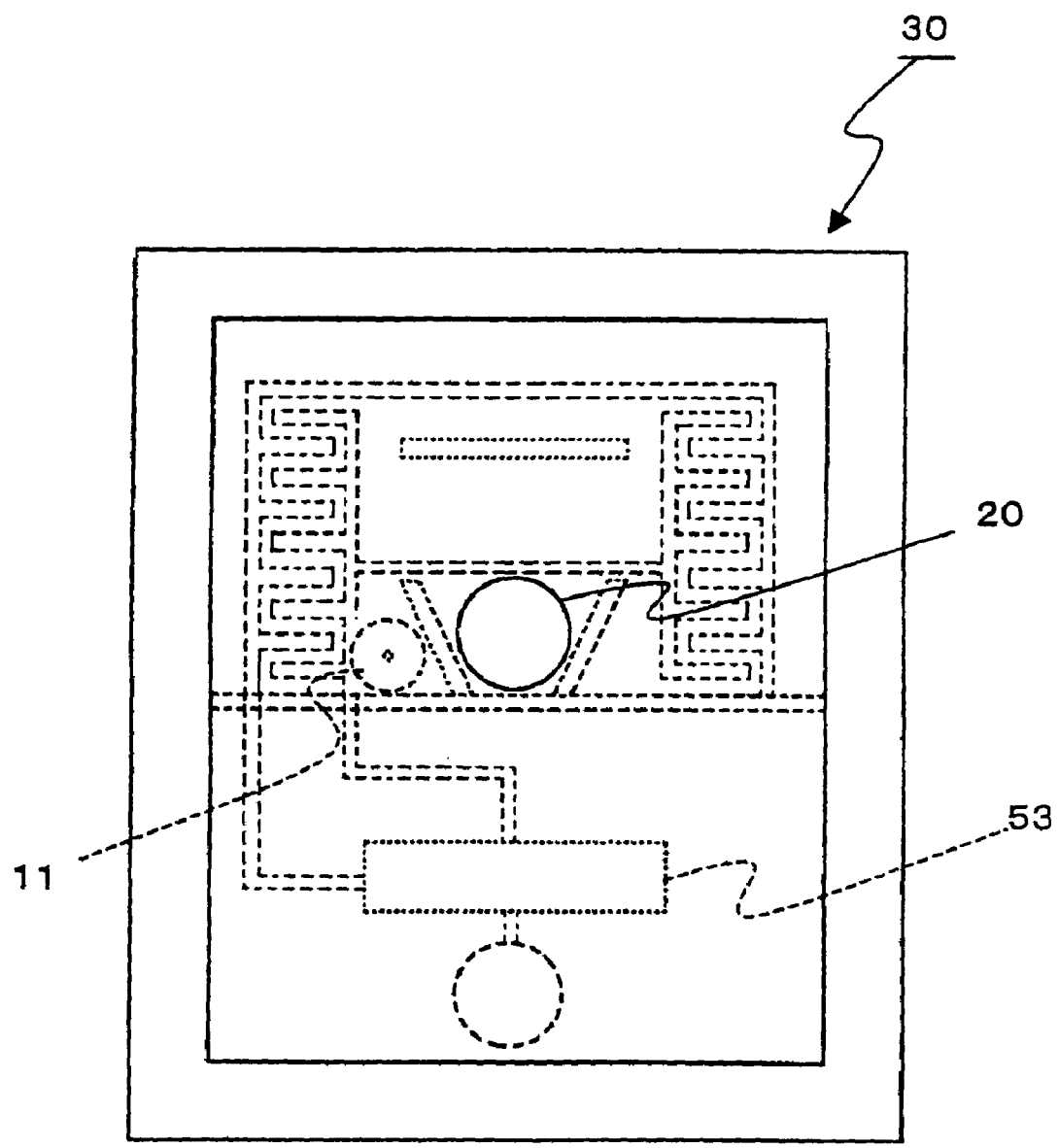
FIG. 20 is a front view showing the action of the object tilt and fall detection apparatus according to the second embodiment.

Hence, as shown in FIG. 20, even when the box body 2 is returned to its original position after tilting or falling, the operator is unable to confirm the existence of the disk body 11 from the transparent part 20 of the detection apparatus 30 when looking through the hole 20, and therefore the operator is able to confirm definitively that the box body 2 has fallen once. Further, by looking at the display screen of the display device 53, on which the time at which time measurement was stopped (May 12, 2003, 14:13, for example) is displayed, the operator is also able to confirm definitively the time at which the box body 2 fell or the amount of time that has elapsed from the beginning of measurement.

As described above, in the present invention, timer means are provided for stopping time measurement using a disk body which rolls in accordance with the tilting of an object, and for displaying the time at which this measurement is stopped. As a result, the time at which the object, such as a box body, tilts or falls can be confirmed definitively, and hence the cause of damage to a product stored in the interior of the object, such as a precision instrument, can be pinpointed easily, enabling measures to be taken swiftly to prevent such damage from occurring during transportation.

Moreover, the time of tilting or falling is displayed by the timer means, and hence malicious attempts to hide the fact that the object tilted or fell by returning the disk body to its original position can be eliminated.

INDUSTRIAL APPLICABILITY

As described above, the object tilt and fall detection apparatus according to the present invention is suitable for use as an apparatus for confirming the time at which an object tilts or falls. The apparatus is particularly suitable for use as an apparatus for detecting easily that a box body transporting precision instruments has fallen over.

The invention claimed is:

1. An object tilt and fall detection apparatus for detecting the tilt and fall of an object using a disk body which rolls in accordance with the tilt of the object, characterized in comprising:
   a cover member having a deformable recessed portion for positioning and storing the disk body, the cover member releasing the disk body from the recessed portion when the recessed portion is deformed such that the disk body moves to a position where the disk body rolls in accordance with the tilt of the object; and
   timer means for starting time measurement, stopping the time measurement in accordance with the rolling of the disk body, and displaying the time at which the measurement is stopped.

2. The object tilt and fall detection apparatus according to claim 1, characterized in that the timer means comprises:
   a display device for displaying time;
   a measurement start switch for transmitting a time measurement start signal;
   a measurement stop switch for transmitting a time measurement stop signal; and
   a controller for starting the time measurement on the basis of the measurement start signal from the measurement start switch, stopping the time measurement on the basis of the measurement stop signal from the measurement stop switch, and causing the display device to display a measurement stop time.

3. The object tilt and fall detection apparatus according to claim 2, characterized in that the measurement stop switch comprises:
   a first switch lead having a contact terminal formed on a tip end thereof; and
   a second switch lead having a movable terminal formed on a tip end thereof, the movable terminal contacting the contact terminal elastically through contact caused by the rolling of the disk body.

4. An object tilt and fall detection apparatus for detecting the tilt and fall of an object using a conductive disk body which rolls in accordance with the tilt of the object, characterized in comprising:
   a removable temporary locking pin for restraining the movement of the disk body when fitted into the disk body and releasing the restriction on the disk body when removed from the disk body; and
   timer means comprising at least:
   a display device for displaying time;
   a measurement start switch for transmitting a time measurement start signal;
   a measurement stop switch constituted by a printed wiring pattern group comprising at least a pair of printed wiring patterns opposing each other at a predetermined interval without intersecting, for transmitting a time measurement stop signal by short-circuiting electrically when contacted slidingly by the conductive disk body; and
   a controller for starting the time measurement on the basis of the measurement start signal from the measurement start switch, stopping the time measurement on the basis of the measurement stop signal from the measurement stop switch, and causing the display device to display a measurement stop time.

5. The object tilt and fall detection apparatus according to claim 4, characterized in that the printed wiring pattern group is formed in a meandering, substantially reverse C shape.

* * * * *